(12) United States Patent
Kim

(10) Patent No.: US 11,347,345 B2
(45) Date of Patent: May 31, 2022

(54) TOUCH DISPLAY DEVICE, TOUCH CIRCUIT, AND PEN SENSING METHOD FOR SENSING VARIOUS TYPES OF PENS

(71) Applicant: LG Display Co., Ltd., Seoul (KR)

(72) Inventor: KiYong Kim, Gyeonggi-do (KR)

( * ) Notice: Subject to any disclaimer, the term of this patent is extended or adjusted under 35 U.S.C. 154(b) by 0 days.

(21) Appl. No.: 17/116,729

(22) Filed: Dec. 9, 2020

(65) Prior Publication Data

US 2021/0200404 A1    Jul. 1, 2021

(30) Foreign Application Priority Data

Dec. 30, 2019    (KR) .......... 10-2019-0178149

(51) Int. Cl.
*G06F 3/041*    (2006.01)

(52) U.S. Cl.
CPC ........ *G06F 3/04162* (2019.05); *G06F 3/0412* (2013.01)

(58) Field of Classification Search
CPC .. G06F 3/0412; G06F 3/0445; G06F 3/04162; G06F 3/03545; G06F 2203/04108
See application file for complete search history.

(56) References Cited

U.S. PATENT DOCUMENTS

2018/0113519 A1*    4/2018   Yamamoto .......... G06F 3/03545

\* cited by examiner

*Primary Examiner* — Lisa S Landis
(74) *Attorney, Agent, or Firm* — Seed IP Law Group LLP

(57) ABSTRACT

Embodiments of the present disclosure relate to a touch display device, a touch circuit, and a pen sensing method, allows various pen protocols to be adaptively set, thereby sensing various types of pens or sensing a pen by using various pen protocols.

17 Claims, 26 Drawing Sheets

FIG.15

Pen Protocol Setting Table (1500)

| TP | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| Type | TV1 | TV2 | TV3 | TV4 | TV5 | TV6 | TV7 | TV8 | TV9 | TV10 | TV11 | TV12 | TV13 | TV14 | TV15 | TV16 |
| Mode | MV1 | MV2 | MV3 | MV4 | MV5 | MV6 | MV7 | MV8 | MV9 | MV10 | MV11 | MV12 | MV13 | MV14 | MV15 | MV16 |

Type Description Table (1510)

| Type | Type 1 | Type 2 | Type 3 | Type 4 | Type 5 | Type 6 | Type 7 |
|---|---|---|---|---|---|---|---|
| Type Value(TV) | 1 (001) | 2 (010) | 3 (011) | 4 (100) | 5 (101) | 6 (110) | 7 (111) |
| Description | BCON / No use | 2 Symbol | Noise index 1 | 4 Symbol | Noise index 2 | 6 Symbol | 8 Symbol |

Mode Description Table (1520)

| Mode | Non-DC Mode | DC Mode |
|---|---|---|
| Mode Value (MV) | 0 | 1 |
| Description | Not operate in DC Mode | Operate in DC Mode |

FIG.24

*Pen Protocol Setting Table (1500) for Full scan mode (Finger position & Pen searching)*

| TP | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| Type | 1 (BCON) | 2 (2 Symbol) | 2 (2 Symbol) | 2 (2 Symbol) | 2 (2 Symbol) | 2 (2 Symbol) | 2 (2 Symbol) | 1 (BCON) | 2 (2 Symbol) | 2 (2 Symbol) | 2 (2 Symbol) | 2 (2 Symbol) | 2 (2 Symbol) | 2 (2 Symbol) | 2 (2 Symbol) | 2 (2 Symbol) |
| Mode | 0 | 0 | 0 | 0 | 0 | 0 | 0 | 0 | 0 | 0 | 0 | 0 | 0 | 0 | 0 | 0 |

*Pen Protocol Setting Table (1500) for Local scan mode (Finger position, Pen Data)*

| TP | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| Type | 1 (2 Symbol) | 2 (2 Symbol) | 4 (2 Symbol) | 2 (2 Symbol) | 2 (2 Symbol) | 4 (4 Symbol) | 6 (6 Symbol) | 2 (2 Symbol) | 2 (2 Symbol) | 4 (4 Symbol) | 6 (6 Symbol) | 2 (2 Symbol) | 2 (2 Symbol) | 4 (4 Symbol) | 6 (6 Symbol) | 2 (2 Symbol) |
| Mode | 0 | 1 | 1 | 0 | 1 | 1 | 1 | 0 | 1 | 1 | 1 | 0 | 1 | 1 | 1 | 0 |

⇨ 1st Pen Protocol Setting

*Full scan mode (Finger position & Pen searching)*

| TP | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| Type | BCON | Ping | Ping | Ping | Ping | Ping | Ping | BCON | Ping | Ping | Ping | Ping | Ping | Ping | Ping | Ping |
| Mode | Non-DC | Non-DC | Non-DC | Non-DC | Non-DC | Non-DC | Non-DC | Non-DC | Non-DC | Non-DC | Non-DC | Non-DC | Non-DC | Non-DC | Non-DC | Non-DC |

*Local scan mode (Finger position, Pen Data)*

| TP | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| Type | BCON | Pen position | Pen data | Finger | Pen position | Pen data | Pen data | Finger | Pen position | Pen data | Pen data | Finger | Pen position | Pen data | Pen data | Finger |
| Mode | Non-DC | DC | DC | Non-DC | DC | DC | DC | Non-DC | DC | DC | DC | Non-DC | DC | DC | DC | Non-DC |

FIG.25

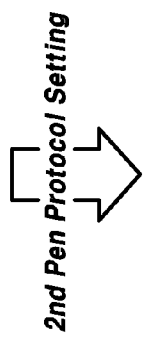

*Pen Protocol Setting Table (1500) for Full scan mode (Finger position & Pen searching)*

| TP | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| Type | 1 (BCON) | 2 (2 Symbol) | 2 (2 Symbol) | 2 (2 Symbol) | 2 (2 Symbol) | 1 (No use) | 1 (No use) | 1 (No use) | 1 (BCON) | 2 (2 Symbol) | 2 (2 Symbol) | 2 (2 Symbol) | 2 (2 Symbol) | 1 (No use) | 1 (No use) | 1 (No use) |
| Mode | 0 | 0 | 0 | 0 | 0 | x | x | x | 0 | 0 | 0 | 0 | 0 | x | x | x |

*Pen Protocol Setting Table (1500) for Local scan mode (Finger position, Pen Data)*

| TP | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| Type | 1 (2 Symbol) | 2 (2 Symbol) | 2 (2 Symbol) | 2 (2 Symbol) | 2 (2 Symbol) | 1 (No use) | 6 (6 Symbol) | 2 (2 Symbol) | 1 (BCON) | 6 (6 Symbol) | 6 (6 Symbol) | 2 (2 Symbol) | 6 (6 Symbol) | 6 (6 Symbol) | 6 (6 Symbol) | 2 (2 Symbol) |
| Mode | 0 | 0 | 0 | 0 | 0 | x | 1 | 1 | 0 | 1 | 1 | 1 | 1 | 1 | 1 | 1 |

2nd Pen Protocol Setting ⇒

*Full scan mode (Finger position & Pen searching)*

| TP | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| Type | BCON | Finger/Pen position | Finger/Pen position | Finger/Pen position | Finger/Pen position | Dummy | Dummy | Dummy | BCON | Finger/Pen position | Finger/Pen position | Finger/Pen position | Finger/Pen position | Dummy | Dummy | Dummy |
| Mode | Non-DC | Non-DC | Non-DC | Non-DC | Non-DC | x | x | x | Non-DC | Non-DC | Non-DC | Non-DC | Non-DC | x | x | x |

*Local scan mode (Finger position, Pen position, Pen Data)*

| TP | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| Type | BCON | Finger/Pen position | Finger/Pen position | Finger/Pen position | Finger/Pen position | Dummy | Pen data | Pen data | BCON | Pen data | Pen data | Pen data | Pen data | Pen data | Pen data | Pen data |
| Mode | Non-DC | Non-DC | Non-DC | Non-DC | Non-DC | x | DC | DC | Non-DC | DC | DC | DC | DC | DC | DC | DC |

TOUCH DISPLAY DEVICE, TOUCH CIRCUIT, AND PEN SENSING METHOD FOR SENSING VARIOUS TYPES OF PENS

CROSS REFERENCE TO RELATED APPLICATION

This application claims priority from Korean Patent Application No. 10-2019-0178149, filed on Dec. 30, 2019, which is hereby incorporated by reference for all purposes as if fully set forth herein.

BACKGROUND

Technical Field

Embodiments of the present disclosure relate to a touch display device, a touch circuit, and a pen sensing method.

Description of the Related Art

With the development of the information society, demands for display devices for displaying images are increasing in various forms, and in recent years, various display devices such as liquid crystal display and organic light emitting display have been utilized.

Such a display device provides a touch-based input method that allows a user to easily and intuitively and conveniently input information or commands by escaping from a conventional input method such as button, keyboard, and mouse.

Further, in addition to a finger or the like, a pen touch technology has also been developed in response to increasing demand for sophisticated pen touch input. Furthermore, there is an increasing demand for a pen touch technology capable of processing touch input for not only a single pen but also a plurality of pens.

Various pens that can be recognized by a display device are being manufactured, and since these various pens operate in different manners, the display device also provides a pen sensing function fixedly for a specific pen. Therefore, despite the need for a user to use various types of pens, user's various pen usage requirements are not satisfied at all.

BRIEF SUMMARY

Embodiments of the present disclosure may provide a touch display device, a touch circuit, and a pen sensing method capable of sensing various pens.

In addition, embodiments of the present disclosure may provide a touch display device, a touch circuit, and a pen sensing method capable of setting various pen protocols.

In addition, embodiments of the present disclosure may provide a touch display device, a touch circuit, and a pen sensing method capable of changing a pen protocol to be used when interworking with a pen.

In addition, according to embodiments of the present disclosure, when the interworking pen is changed, it is possible to provide a touch display device, a touch circuit, and a pen sensing method that can be changed to a pen protocol capable of interworking with the changed pen.

In addition, according to embodiments of the present disclosure, when it is necessary to interwork with two or more pens operating in different pen protocols, it is possible to provide a touch display device, a touch circuit, and a pen sensing method capable of sensing two or more pens while changing the pen protocol every one or two or more touch frame times.

In one aspect, embodiments of the present disclosure may provide a touch display device including: a touch panel including a plurality of touch electrodes; and a touch circuit configured to supply an uplink signal to one or more touch electrodes among the plurality of touch electrodes during one or more touch time periods set as uplink communication period among N touch time periods included in each of a plurality of touch frame times, and to receive a downlink signal, which is a pen signal, during one or more touch time periods set as a downlink communication period among the N touch time periods through one or more touch electrodes among the plurality of touch electrodes.

In a touch display device according to embodiments of the present disclosure, a number or sequence of one or more touch time periods set as the downlink communication period among the N touch time periods included in a first touch frame time among the plurality of touch frame times may be different from a number or sequence of one or more touch time periods set as the downlink communication period among the N touch time periods included in a second touch frame time different from the first touch frame time among the plurality of touch frame times.

In a touch display device according to embodiments of the present disclosure, the touch circuit receives the downlink signal which is a pen signal output from a first pen, during one or more touch time periods set as the downlink communication period among the N touch time periods included in the first touch frame time, and receives the downlink signal which is a pen signal output from a second pen different from the first pen, during one or more touch time periods set as the downlink communication period among the N touch time periods included in the second touch frame time.

In a touch display device according to embodiments of the present disclosure, the first pen and the second pen are different in at least one of a manufacturer, a model, and an operating pen protocol.

In a touch display device according to embodiments of the present disclosure, one or more first touch time periods and one or more second touch time periods among the N touch time periods included in each of the plurality of touch frame times may be set as the downlink communication period, a first downlink signal during the one or more first touch time periods may include periodic pulses, and a second downlink signal during the one or more second touch time periods may include non-periodic pulses.

In a touch display device according to embodiments of the present disclosure, the uplink signal includes pen driving control information, and a number or sequence of one or more touch time periods set as the uplink communication period among the N touch time periods included in a first touch frame time among the plurality of touch frame times may be different from a number or sequence of one or more touch time periods set as the uplink communication period among the N touch time periods included in a second touch frame time different from the first touch frame time among the plurality of touch frame times.

In a touch display device according to embodiments of the present disclosure, the touch circuit may set one or more first touch time periods and one or more second touch time periods among the N touch time periods included in each of the plurality of touch frame times as a DC mode period and a non-DC mode period respectively, supply DC voltage to all or part of the plurality of touch electrodes during the one or more first touch time periods set as the DC mode period, and supply non-DC voltage to all or part of the plurality of touch electrodes or stop the voltage supply during the one or more second touch time periods set as the non-DC mode period.

In a touch display device according to embodiments of the present disclosure, all or part of one or more touch time periods set as the downlink communication period, among the N touch time periods included in each of the plurality of touch frame times, may be set as the DC mode period.

In a touch display device according to embodiments of the present disclosure, a number or sequence of one or more touch time periods set as the DC mode period among the N touch time periods included in the first touch frame time, and a number or sequence of one or more touch time periods set as the DC mode period among the N touch time periods included in the second touch frame time may be different from each other.

A touch display device according to embodiments of the present disclosure may further include a type register for storing a type value indicating a type of driving operation of the touch circuit associated with the pen, with respect to each of the N touch time periods included in the plurality of touch frame times. The touch circuit modifies the type register between the first touch frame time and the second touch frame time.

A touch display device according to embodiments of the present disclosure may further include a mode register for storing a mode value indicating a mode for driving the touch panel, with respect to each of the N touch time periods. The touch circuit modifies the mode register between the first touch frame time and the second touch frame time.

In a touch display device according to embodiments of the present disclosure, the touch circuit sets one or more first touch time periods and one or more second touch time periods among the N touch time periods included in each of the plurality of touch frame times, as a first noise index period and a second noise index period, respectively.

In a touch display device according to embodiments of the present disclosure, the touch circuit supplies a driving signal having an integer multiple of a first frequency to one or more of the plurality of touch electrodes, during the one or more first touch time periods set as the first noise index period.

In a touch display device according to embodiments of the present disclosure, the touch circuit supplies a driving signal having an integer multiple of a second frequency different from the first frequency to one or more of the plurality of touch electrodes, during the one or more second touch time periods set as the second noise index period.

In another aspect, embodiments of the present disclosure may provide a touch circuit including: a sensing circuit configured to supply an uplink signal to one or more touch electrodes among the plurality of touch electrodes during one or more touch time periods set as uplink communication period among N touch time periods included in each of a plurality of touch frame times, and to receive a downlink signal, which is a pen signal, during one or more touch time periods set as a downlink communication period among the N touch time periods through one or more touch electrodes among the plurality of touch electrodes; and a pen protocol setting circuit configured to set a number or sequence of one or more touch time periods set as the downlink communication period among the N touch time periods included in a first touch frame time among the plurality of touch frame times, and a number or sequence of one or more touch time periods set as the downlink communication period among the N touch time periods included in a second touch frame time different from the first touch frame time among the plurality of touch frame times to be different from each other.

In a touch circuit according to embodiments of the present disclosure, the sensing circuit receives the downlink signal which is a pen signal output from a first pen, during one or more touch time periods set as the downlink communication period among the N touch time periods included in the first touch frame time, and receives the downlink signal which is a pen signal output from a second pen different from the first pen, during one or more touch time periods set as the downlink communication period among the N touch time periods included in the second touch frame time.

In a touch circuit according to embodiments of the present disclosure, the first pen and the second pen are different in at least one of a manufacturer, a model, and an operating pen protocol.

In a touch circuit according to embodiments of the present disclosure, the pen protocol setting circuit sets a number or sequence of one or more touch time periods set as the uplink communication period among the N touch time periods included in a first touch frame time among the plurality of touch frame times, and a number or sequence of one or more touch time periods set as the uplink communication period among the N touch time periods included in a second touch frame time different from the first touch frame time among the plurality of touch frame times to be different from each other.

In a touch circuit according to embodiments of the present disclosure, the pen protocol setting circuit may set one or more first touch time periods and one or more second touch time periods among the N touch time periods included in each of the plurality of touch frame times as a DC mode period and a non-DC mode period.

In a touch circuit according to embodiments of the present disclosure, the sensing circuit may supply DC voltage to all or part of the plurality of touch electrodes during the one or more first touch time periods set as the DC mode period, and may supply non-DC voltage to all or part of the plurality of touch electrodes or stop the voltage supply during the one or more second touch time periods set as the non-DC mode period.

In a touch circuit according to embodiments of the present disclosure, the pen protocol setting circuit sets all or part of one or more touch time periods set as the downlink communication period, among the N touch time periods included in each of the plurality of touch frame times, as the DC mode period.

In a touch circuit according to embodiments of the present disclosure, the pen protocol setting circuit sets a number or sequence of one or more touch time periods set as the DC mode period among the N touch time periods included in the first touch frame time, and a number or sequence of one or more touch time periods set as the DC mode period among the N touch time periods included in the second touch frame time to be different from each other.

In another aspect, embodiments of the present disclosure may provide a touch display device including: a touch panel including a plurality of touch electrodes; and a touch circuit configured to set one or more first touch time periods and one or more second touch time periods among N touch time periods included in each of a plurality of touch frame times as a DC mode period and a non-DC mode period, to supply a DC voltage to all or part of the plurality of touch electrodes during the one or more first touch time periods set as the DC mode period, and to supply a non-DC voltage to all or part of the plurality of touch electrodes or stop the voltage supply during the one or more second touch time periods set as the non-DC mode period.

In a touch display device according to embodiments of the present disclosure, a number or sequence of one or more touch time periods set as the DC mode period among the N touch time periods included in a first touch frame time of the plurality of touch frame times is different from a number or sequence of one or more touch time periods set as the DC mode period among the N touch time periods included in a second touch frame time different from the first touch frame time of the plurality of touch frame times.

In another aspect, embodiments of the present disclosure may provide a touch circuit including: a sensing circuit configured to supply a DC voltage to all or part of a plurality of touch electrodes during one or more first touch time periods set as a DC mode period among N touch time periods included in each of a plurality of touch frame times, and to supply a non-DC voltage to all or part of the plurality of touch electrodes or stop the voltage supply during one or more second touch time periods set as a non-DC mode period among the N touch time periods; and a pen protocol setting circuit configured to set one or more first touch time periods and one or more second touch time periods among the N touch time periods included in each of the plurality of touch frame times as the DC mode period and the non-DC mode period, and to set a number or sequence of one or more first touch time periods set as the DC mode period among the N touch time periods included in a first touch frame time of the plurality of touch frame times to be different from a number or sequence of the one or more first touch time periods set as the DC mode period among the N touch time periods included in a second touch frame time different from the first touch frame time of the plurality of touch frame times.

In another aspect, embodiments of the present disclosure may provide a method of sensing a pen for a touch display device, including: a first step of outputting a first beacon signal based on a first pen protocol; a second step of determining whether a first pen signal output from a first pen operating with the first pen protocol is received in response to the first beacon signal; a third step of sensing the first pen when the first pen signal is received in the second step; a fourth step of outputting a second beacon signal based on a second pen protocol different from the first pen protocol; a fifth step of determining whether a second pen signal output from a second pen operating with the second pen protocol is received in response to the second beacon signal; and a sixth step of sensing the second pen when the second pen signal is received in the fifth step.

When the first pen signal is not received in the second step, the touch display device performs a pen protocol change setting for changing an operation pen protocol from the first pen protocol to the second pen protocol.

According to embodiments of the present disclosure, it is possible to provide a touch display device, a touch circuit, and a pen sensing method capable of sensing various pens.

In addition, according to embodiments of the present disclosure, it is possible to provide a touch display device, a touch circuit, and a pen sensing method capable of setting various pen protocols.

In addition, according to embodiments of the present disclosure, it is possible to provide a touch display device, a touch circuit, and a pen sensing method capable of changing a pen protocol to be used when interworking with a pen.

In addition, according to embodiments of the present disclosure, when the interworking pen is changed, it is possible to provide a touch display device, a touch circuit, and a pen sensing method that can be changed to a pen protocol capable of interworking with the changed pen.

In addition, according to embodiments of the present disclosure, when it is necessary to interwork with two or more pens operating in different pen protocols, it is possible to provide a touch display device, a touch circuit, and a pen sensing method capable of sensing two or more pens while changing the pen protocol every one or two or more touch frame times.

BRIEF DESCRIPTION OF THE SEVERAL VIEWS OF THE DRAWINGS

The above and other objects, features and advantages of the present disclosure will be more apparent from the following detailed description in conjunction with the accompanying drawings, in which:

FIGS. 15 to 17 are diagrams illustrating a pen protocol setting table and two registers of a touch circuit according to embodiments of the present disclosure;

FIG. 24 is a diagram illustrating setting of a first pen protocol according to a method of setting a pen protocol according to embodiments of the present disclosure;

FIG. 25 is a diagram illustrating setting of a second pen protocol according to a method of setting a pen protocol according to embodiments of the present disclosure.

DETAILED DESCRIPTION

Figure 1:
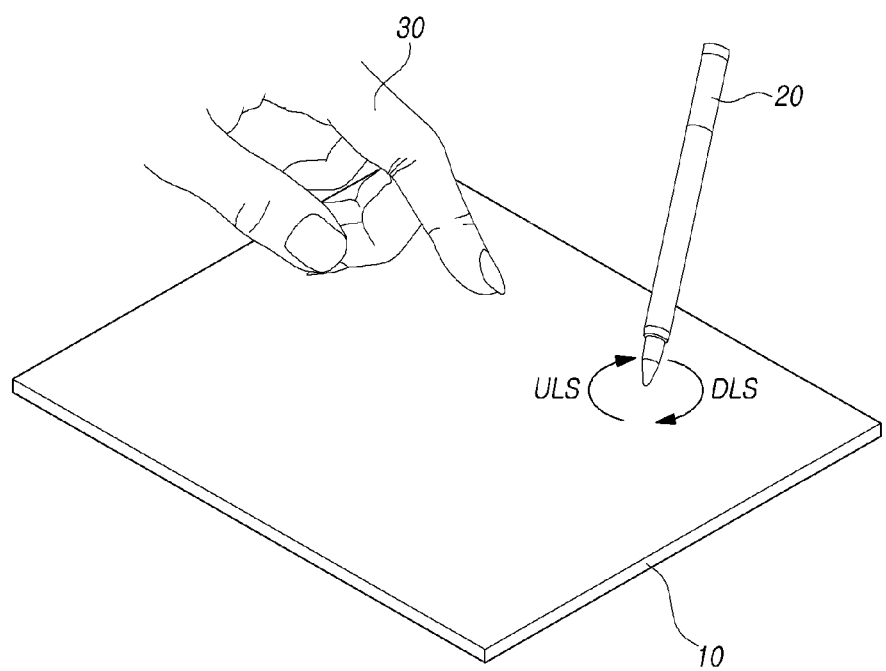
FIG. 1 is a diagram illustrating a touch display device according to embodiments of the present disclosure.

In the following description of examples or embodiments of the present disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the present disclosure, detailed descriptions of well-known functions and components incorporated herein will be omitted when it is determined that the description may make the subject matter in some embodiments of the present disclosure rather unclear. The terms such as "including", "having", "including", "constituting" "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" may be used herein to describe elements of the present disclosure. Each of these terms is not used to define essence, order, sequence, or number of elements, etc., but is used merely to distinguish the corresponding element from other elements.

When it is mentioned that a first element "is connected or coupled to", "contacts or overlaps", etc., a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc., each other via a fourth element. Here, the second element may be included in at least one of two or more elements that "are connected or coupled to", "contact or overlap", etc., each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes, etc., are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can".

FIG. 1 is a diagram illustrating a touch display device 10 according to embodiments of the present disclosure.

The touch system according to embodiments of the present disclosure may include a touch display device 10 and a pen 20 interworking therewith.

The touch display device 10 is an electronic device capable of providing not only an image display function but also a touch sensing function (finger touch sensing function) for a finger 30 or a touch pointer (e.g., passive pen, etc.) having equivalent characteristics, and providing a pen touch sensing function (pen recognition function) for one or more pens 20.

One or more pens 20 are also referred to as an active pen, have a signal transmission/reception function, may perform interworking operation with the touch display device 10, and may include their own power. However, throughout this specification, for convenience of description, the active pen is simply described as "pen 20".

Therefore, the pen 20 described in the present specification may be referred to as a stylus, a stylus pen, or an active stylus pen, as well as an active pen.

A passive pen that is distinguished from the pen 20 described in this specification does not have a signal transmission/reception function, an interworking operation with the touch display device 10, and its own power. The touch sensing using the passive pen may be performed in the same manner as the touch sensing using the finger 30.

The pen 20 corresponding to the active pen is an active touch input tool having a function of transmitting and receiving a signal to and from the touch display device 10, and the finger 30, the passive pen, etc., are a passive touch input tool that does not have a function of transmitting and receiving a signal of the touch display device 10.

For pen touch sensing, the pen 20 supplies a downlink signal (DLS) to the touch display device 10, and the touch display device 10 supplies an uplink signal (ULS) to the pen 20.

In the following, for convenience of description, a finger 30 is described as a representative of a passive touch input tool. However, the finger 30 described below should be interpreted as including all passive touch input tools such as a passive pen.

The touch display device 10 according to embodiments of the present disclosure may be, for example, a television (TV), a monitor, or the like, or a mobile device such as a tablet or a smart phone.

The touch display device 10 according to embodiments of the present disclosure may include a display part for providing an image display function and a touch sensing part for touch sensing.

Figure 2:
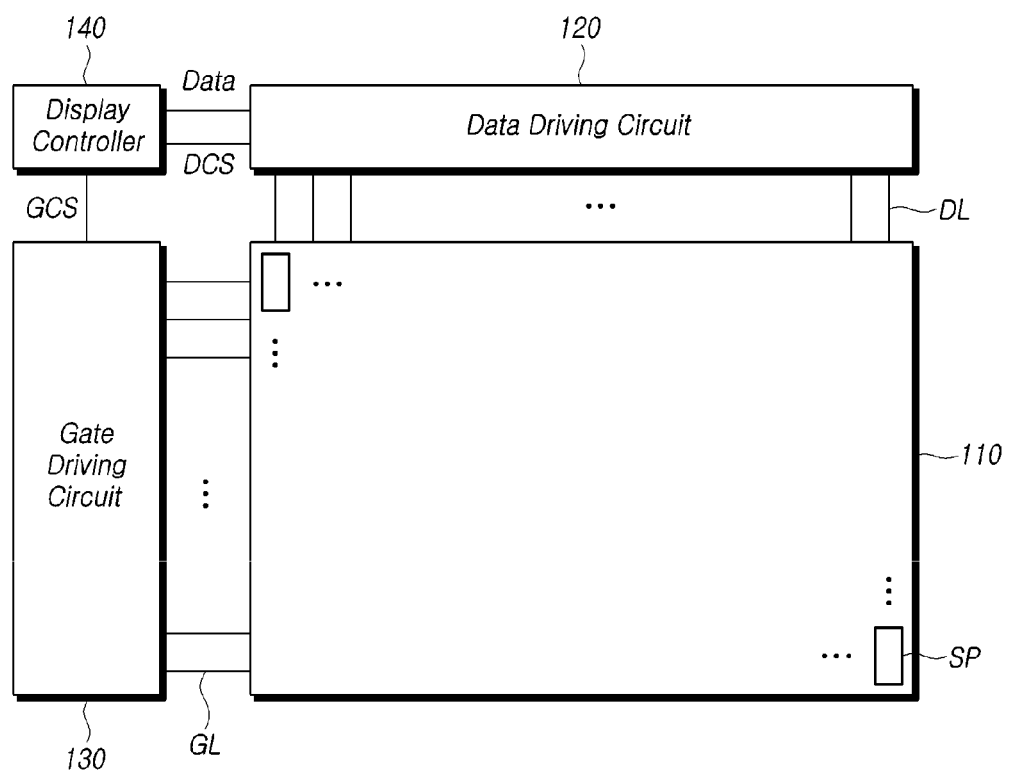
FIG. 2 is a diagram illustrating a display part of a touch display device according to embodiments of the present disclosure.

FIG. 2 is a diagram illustrating a display part of a touch display device 10 according to embodiments of the present disclosure.

Referring to FIG. 2, the display part of the touch display device 10 according to embodiments of the present disclosure may include a display panel 110, a data driving circuit 120, a gate driving circuit 130, a display controller 140, and the like.

The display panel 110 includes a plurality of data lines DL and a plurality of gate lines GL, and includes a plurality of sub-pixels SP defined by a plurality of data lines DL and a plurality of gate lines GL.

The data driving circuit 120 supplies a data voltage to a plurality of data lines DL to drive the data lines DL.

The gate driving circuit 130 drives the plurality of gate lines GL by sequentially supplying a scan signal to the plurality of gate lines GL.

The display controller 140 supplies various control signals (DCS, GCS) to the data driving circuit 120 and the gate driving circuit 130 to control the operation of the data driving circuit 120 and the gate driving circuit 130.

The display controller 140 starts scanning according to the timing implemented in each frame, converts input image data inputted from an external to be adjusted to a data signal format used by the data driving circuit 120 and outputs the converted image data, and controls data driving at a suitable time to be adjusted to the scan.

The display controller 140 may be a timing controller used in conventional display technology, or a control device that further performs other control functions while including the timing controller.

The display controller 140 may be implemented as a separate component from the data driving circuit 120, or may be implemented as an integrated circuit together with the data driving circuit 120.

Meanwhile, the data driving circuit 120 may be implemented by including at least one source driver integrated circuit.

Each source driver integrated circuit may include a shift register, a latch circuit, a digital to analog converter (DAC), an output buffer, and the like.

In some cases, each source driver integrated circuit may further include an analog to digital converter.

The gate driving circuit 130 may be implemented by including at least one gate driver integrated circuit.

Each gate driver integrated circuit may include a shift register, a level shifter, and the like.

The data driving circuit 120 may be located only in one side (e.g., an upper side or a lower side) of the display panel 110, and in some cases, may be located in both sides (e.g., an upper side and a lower side) of the display panel 110 according to a driving method, a panel design method, or the like.

The gate driving circuit 130 may be located only in one side (e.g., a left side or a right side) of the display panel 110, and in some cases, may be located in both sides (e.g., a left side and a right side) of the display panel 110 according to a driving method, a panel design method, or the like.

Figure 3:
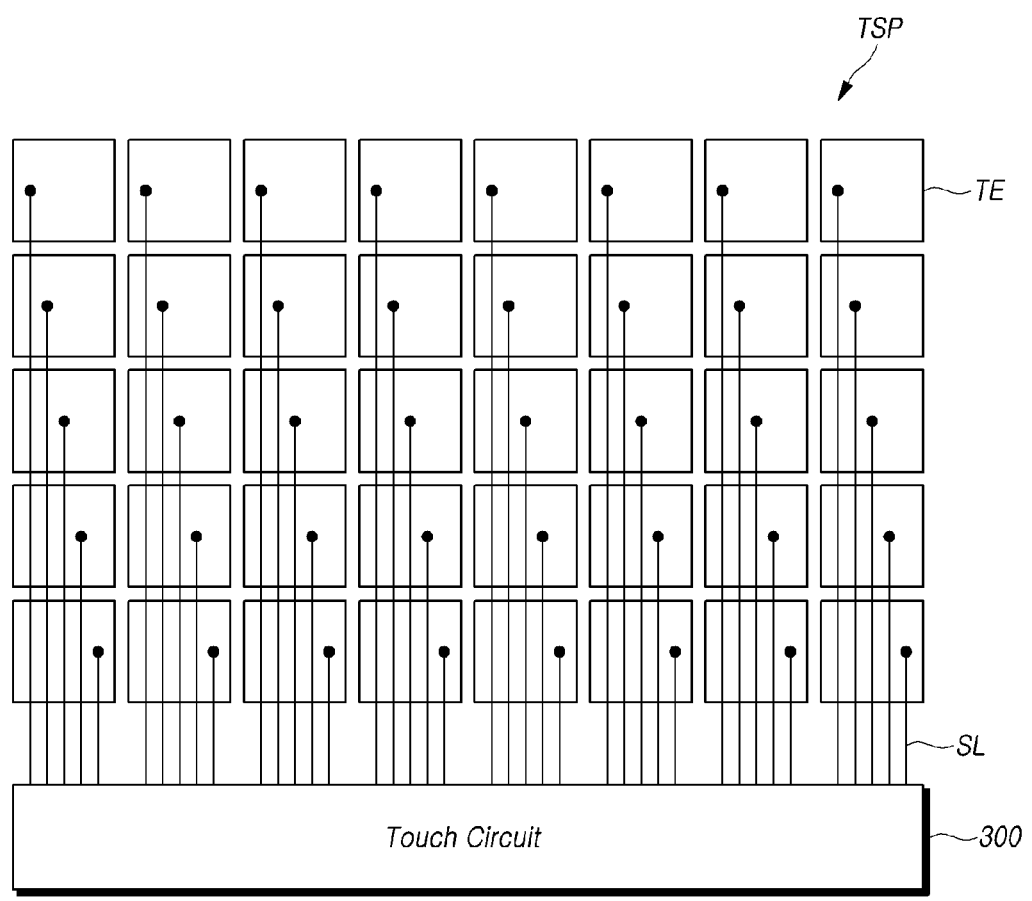
FIG. 3 is a diagram illustrating a touch sensing part of a touch display device according to embodiments of the present disclosure.

FIG. 3 is a diagram illustrating a touch sensing part of a touch display device 10 according to embodiments of the present disclosure.

Referring to FIG. 3, in order to sense a touch by the pen 20 or the finger 30, the touch display device 10 according to embodiments of the present disclosure may include a touch panel (TSP) in which touch electrodes (TE) are disposed and a touch circuit 300 for driving the touch panel.

The touch display device 10 according to embodiments of the present disclosure provides a capacitance-based touch sensing function, for example, may sense a touch based on a capacitance (mutual-capacitance) between touch electrodes (TE). Alternatively, as another example, the touch may be sensed based on the capacitance (self-capacitance) between a touch electrode TE and a touch object (e.g., finger, pen, etc.).

For example, referring to FIG. 3, the touch display device 10 may provide a touch sensing function based on a capacitance that each touch electrode TE forms with the finger 30 or a self-capacitance that measures the change of the above capacitance to sense a touch input.

Referring to FIG. 3, for self-capacitance based touch sensing, a plurality of touch electrodes (TE) may be disposed in the touch panel (TSP) to be separated from each other.

Each of the plurality of touch electrodes (TE) may be applied with a touch driving signal and may sense a touch sensing signal. Each of the plurality of touch electrodes (TE) may be electrically connected to the touch circuit 300 through one or more signal lines SL.

The shape of one touch electrode TE illustrated in FIG. 3 is merely an example and may be variously designed.

The size of the area where one touch electrode TE is formed may correspond to the size of the area where one sub-pixel SP is formed. The size of the area where one touch electrode TE is formed may be greater than or equal to the size of the area where two or more sub-pixels SP are formed.

One touch electrode TE may overlap two or more sub-pixels SP. In this case, one touch electrode TE may overlap two or more data lines DL and two or more gate lines GL. For example, the size of the area where one touch electrode TE is formed may correspond to the size of several to tens of sub-pixel areas.

Meanwhile, the touch panel (TSP) may be an external type (also referred to as an add-on type) that is manufactured separately from the display panel 110 and coupled to the display panel 110, or may be a built-in type (also referred to as an in-cell type or an on-cell type) embedded in the display panel 110.

The touch display device 10 according to embodiments of the present disclosure may be a liquid crystal display (LCD), an organic light emitting diode (OLED) display, or a quantum dot display. However, the present disclosure is not limited thereto, and may be any of various types of displays if touch-related configurations, structures, and touch sensing methods described below can be applied.

For example, when the touch display device 10 according to embodiments of the present disclosure is a liquid crystal display device (LCD), the touch electrodes (TE) may serve as a touch sensor, and may serve as a common electrode which is disposed in the display panel 110 and to which a common voltage for driving a display is applied.

In another example, when the touch display device 10 according to embodiments of the present disclosure is an OLED display, it may have a top emission structure in which light is emitted to the top of the display panel 110 or a bottom emission structure in which light is emitted to the bottom of the display panel 110.

When the touch display device according to embodiments of the present disclosure is an OLED display, the touch electrodes (TE) are included in the display panel 110 and may be disposed in an upper portion of an encapsulation layer positioned on the transistors and the organic light emitting diodes (OLEDs). The position of the touch electrodes (TE) may be more suitable for a top emission structure. The touch electrodes (TE) may be a mesh type having openings for light emission efficiency, and may be a transparent electrode or may further include a transparent electrode.

When the touch display device 10 according to embodiments of the present disclosure is an OLED display, the touch electrodes (TE) are anode electrodes of the organic light emitting diodes (OLED) included in the display panel 110, or may be electrodes located in various layers positioned below the anode electrodes. The position of the touch electrodes (TE) may be more suitable for a bottom emission structure. The touch electrodes (TE) may be a mesh type having openings for light emission efficiency, and may be a transparent electrode or may further include a transparent electrode.

The touch electrodes (TE) included in the touch display device 10 according to embodiments of the present disclosure may be dedicated electrodes for touch sensing, or electrodes that can be used for both display driving and touch sensing.

Figure 4:
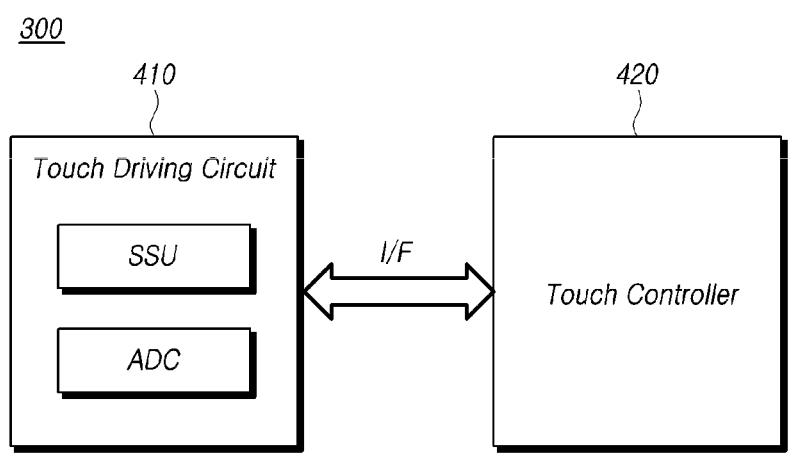
FIG. 4 is a schematic block diagram of a touch circuit of a touch display device according to embodiments of the present disclosure.

FIG. 4 is a schematic block diagram of a touch circuit 300 of a touch display device 10 according to embodiments of the present disclosure.

Referring to FIG. 4, the touch circuit 300 of the touch display device 10 according to embodiments of the present disclosure may include one or more touch driving circuits 410 for driving all or part of the plurality of touch electrodes (TE) in the touch panel (TSP), and sensing all or part of the plurality of touch electrodes (TE) to generate and output sensing data, and a touch controller 420 for controlling the operation of the touch driving circuit 410, and using the sensing data output from the touch driving circuit 410 to determine the presence and/or position of the touch input by the pen 20 or the finger 30.

The touch driving circuit 410 may include a sensing unit SSU that supplies various signals to the touch panel (TSP) and detects various signals from the touch panel (TSP), an analog-to-digital converter ADC that generates digital sensing value corresponding to various signals detected by the sensing unit SSU and supplies sensing data including digital sensing value to the touch controller 420, and the like.

For pen touch sensing, the sensing unit (SSU), during N touch time periods included in each touch frame time, may apply an uplink signal ULS to be supplied to one or more pens 20 to all or part of the plurality of touch electrodes (TE) included in the touch panel (TSP), and may receive a downlink signal DLS, which is output from one or more pens 20 that received the uplink signal ULS through the touch panel (TSP), through one or more touch electrodes (TE).

Here, the uplink refers to a path or channel toward the pen 20 from the touch panel (TSP), and the downlink refers to a path or channel toward the touch panel (TSP) from the pen 20. The analog-to-digital converter ADC may generate a digital sensing value for the downlink signal DLS.

One or more touch driving circuits 410 included in the touch circuit 300 may be implemented as a separate component or implemented as a single component. The touch driving circuit 410 may be implemented as a merged integrated circuit, together with a source driver integrated circuit SDIC that implements the data driving circuit 120. The merged integrated circuit may include a touch driving circuit 410 and a source driver integrated circuit SDIC. When the merged integrated circuit is a built-in type where the touch panel (TSP) is embedded in the display panel 110, and the signal lines SL connected to the touch electrodes (TE) are disposed parallel to the data lines DL, touch driving and data driving can be effectively performed.

Referring to FIG. 4, the touch driving circuit 410 and the touch controller 420 may exchange signals with each other through a communication interface (I/F). The touch driving circuit 410 and the touch controller 420 may perform a master-slave operation. That is, the touch driving circuit 410 may serve as a slave, and the touch controller 420 may serve as a master. The communication interface (I/F) may be, for example, a serial peripheral interface (SPI).

Figure 5:
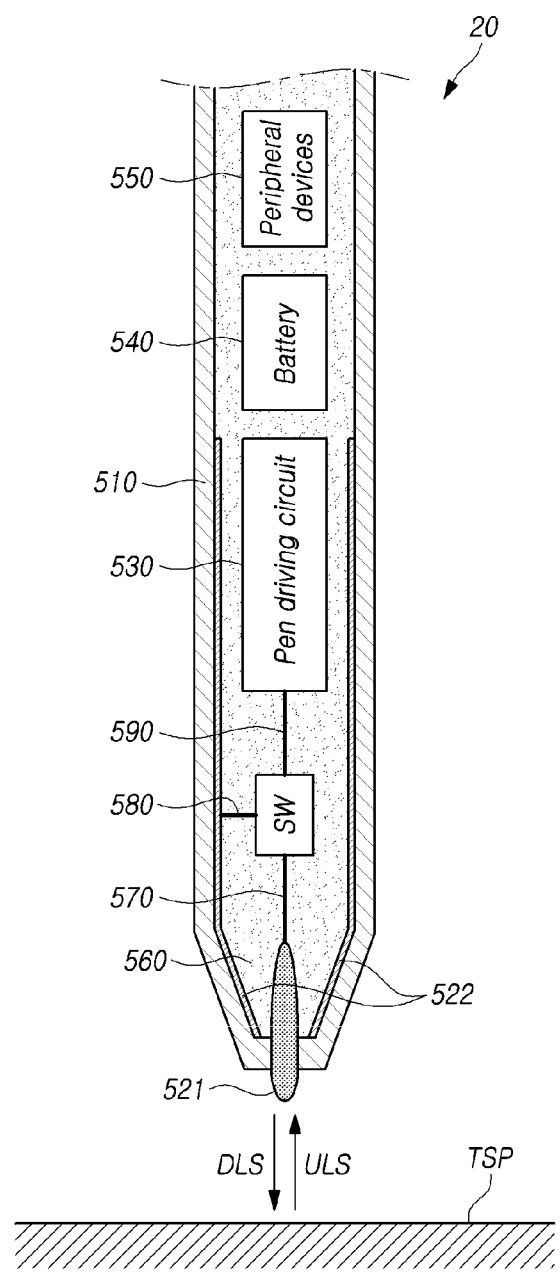
FIG. 5 is a configuration diagram of a pen interworking with a touch display device according to embodiments of the present disclosure.

FIG. 5 is a configuration diagram of a pen 20 interworking with a touch display device 10 according to embodiments of the present disclosure;

Referring to FIG. 5, the pen 20 according to embodiments of the present disclosure may further include a housing 510 corresponding to a case, a first tip 521 protruding to the outside of the housing 510, a second tip 522 provided inside the housing 510 and surrounding the inner side surface of the housing 510, a pen driving circuit 530 provided inside the housing 510 and outputting a downlink signal DLS through the first tip 521 and/or the second tip 522, a battery 540 for supplying power, and various peripheral devices 550 such as button, communication module, and display.

The housing 510 may serve as a ground in electrical terms.

As the first tip 521 serves as a medium (or a transmission antenna) through which a downlink signal (DLS) is transmitted, the second tip 522 may also serve as a medium (or a transmission antenna) through which a downlink signal (DLS) is transmitted.

Since the second tip 522 does not protrude to the outside of the housing 510, it may serve to perform signal transmission similarly to the first tip 521 except that it does not come into contact with the touch panel (TSP).

The pen driving circuit 530 is provided inside the housing 510, electrically connected to one or more of the first tip 521 and the second tip 522, may output a downlink signal DLS through one or more of the first tip 521 and the second tip 522, or may receive an uplink signal ULS through one or more of the first tip 521 and the second tip 522.

The pen driving circuit 530 may be electrically connected to one or more of the first tip 521 and the second tip 522 through a switch SW.

The first tip 521 and the switch SW are connected to a tip wiring 570, and the second tip 522 and the switch SW are connected to a ring wiring 580. The pen driving circuit 530 and the switch SW are connected to a circuit wiring 590.

The switch SW selects one or more of the first tip 521 and the second tip 522 to connect to the pen driving circuit 530.

Meanwhile, the first tip 521 and the second tip 522 are a conductor and are electrically separated. Therefore, an insulating material 560 made of plastic or the like exists between the first tip 521 and the second tip 522.

Meanwhile, as the first tip 521 serves as a medium (or a receiving antenna) through which an uplink signal (ULS) is received, the second tip 522 may also serve as a medium (or a receiving antenna) through which an uplink signal (ULS) is received.

The second tip 522 may have a different shape from the first tip 521.

The second tip 522 may be a coil wound spirally along the inner side surface of the housing 510. The second tip 522 may also be referred to as a ring.

The downlink signal DLS output from the first tip 521 and the downlink signal DLS output from the second tip 522 may have the same signal strength. Alternatively, the downlink signal DLS output from the first tip 521 and the downlink signal DLS output from the second tip 522 may have a different signal strength.

The pen driving circuit 530 may further include a receiving unit for receiving an uplink signal (ULS) (e.g., beacon, ping signal, etc.) applied to one or more touch electrodes (TE) disposed in the touch panel (TSP) through one or more of the first tip 521 and the second tip 522, a transmitting unit for transmitting a downlink signal (DLS) through one or more of the first tip 521 and the second tip 522, a controller for controlling the pen driving operation, and the like, and may further include a pressure unit for measuring a pen pressure.

Figure 6:
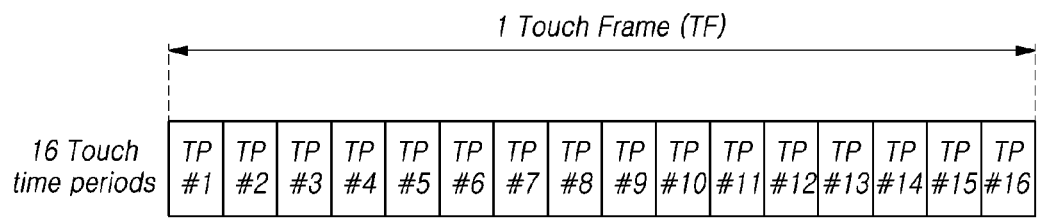
FIG. 6 is a diagram illustrating touch time periods within one touch frame time of a touch display device according to embodiments of the present disclosure.

FIG. 6 is a diagram illustrating touch time periods (TP #1 to TP #16) within one touch frame (TF) time of a touch display device 10 according to embodiments of the present disclosure.

The touch display device 10 according to embodiments of the present disclosure may set a certain touch frame (TF) time, in order to sense a touch by one or more pens 20 and one or more fingers 30, and may repeatedly perform a preset operation for touch sensing for each touch frame (TF) time. Here, as an example, the touch frame (TF) time may be set as a time taken to sense the entire area of the touch panel (TSP) once, in order to sense the presence and/or touch position (touch coordinate) of the finger 30.

Referring to FIG. 6, the touch display device 10 according to embodiments of the present disclosure sets each touch frame (TF) time to include N touch time periods (TP #1 to TP #16, N=16), allocates various functional time periods (e.g., finger sensing time period, pen position sensing time period, pen tilt sensing time period, pen data transmission time period, etc.) for pen touch sensing and finger touch sensing to each of the N touch time periods (TP #1 to TP #16, N=16), and interworks with one or more pens 20 during the N touch time periods (TP #1 to TP #16, N=16) to which various functional time periods are allocated.

The length of the touch frame (TF) time may be set in consideration of the display frame time. For example, the touch frame (TF) time may have a length equal to the display frame time, a length twice the display frame time, or may have a length of ½ of the display frame time.

The number (N) of touch time period in one touch frame (TF) time may be at least three (N≥3). Hereinafter, for convenience of explanation, it is assumed that the number N of touch time periods in one touch frame TF time is 16 (N=16).

The touch display device 10 according to embodiments of the present disclosure may independently or simultaneously perform driving for touch sensing (finger touch sensing, pen touch sensing) and driving for display. This is referred to as "simultaneous driving".

Alternatively, the touch display device 10 according to embodiments of the present disclosure may perform driving for touch sensing (finger touch sensing, pen touch sensing) and driving for display at different times. This is referred to as "time division driving."

Figure 7:
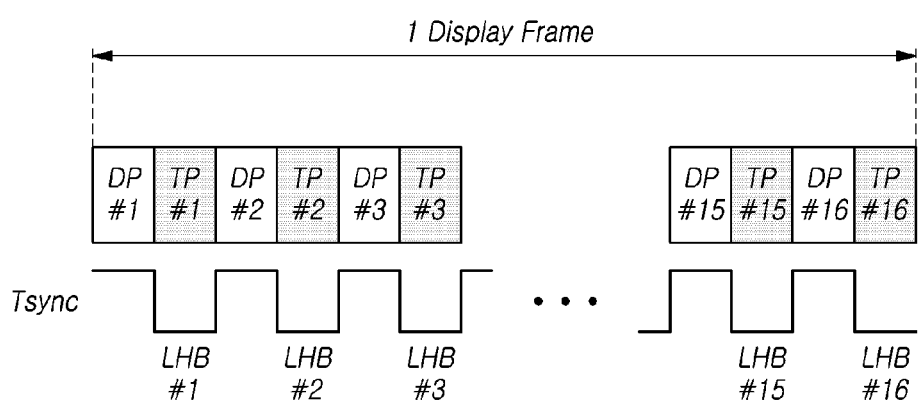
FIG. 7 is a diagram illustrating N touch time periods within one touch frame time, when a touch display device operates according to a time division driving method according to embodiments of the present disclosure.

FIG. 7 is a diagram illustrating N touch time periods (TP #1 to TP #16) within one touch frame (TF) time, when a touch display device 10 operates according to a time division driving method according to embodiments of the present disclosure.

Referring to FIG. 7, each of the N touch time periods (TP #1 to TP #16, N=16) included in one touch frame (TF) time may be divided and defined by a touch synchronization signal (Tsync). The touch controller 420 may provide a touch synchronization signal (Tsync) to the touch driving circuit 410, and the touch driving circuit 410 may perform a preset operation in defined N touch time periods (TP #1 to TP #16, N=16) according to the touch synchronization signal (Tsync).

The touch synchronization signal (Tsync) is a control signal that alternates a touch level signal period that defines the timing of each of a plurality of touch time periods (TP #1 to TP #16), and a non-touch level signal period that defines a non-touch period (e.g., a display driving time period) excluding the plurality of touch time periods (TP #1 to TP #16)

For example, as illustrated in FIG. 7, the touch level period may be a low level voltage period, and the non-touch level period may be a high level voltage period. Alternatively, the touch level period may be a high level voltage period, and the non-touch level period may be a low level voltage period.

Referring to FIG. 7, in the case of the time division driving method, the display driving time periods (DP #1 to DP #16) and the touch time periods (TP #1 to TP #16) may be alternately performed.

In the case of the time division driving method, one touch frame (TF) time is related to the display frame time. In the case of the time division driving method, one touch frame (TF) time may be K times or 1/K times an update cycle (i.e. the display frame time) of the display frame. K is an integer of 1 or more.

Figure 8:
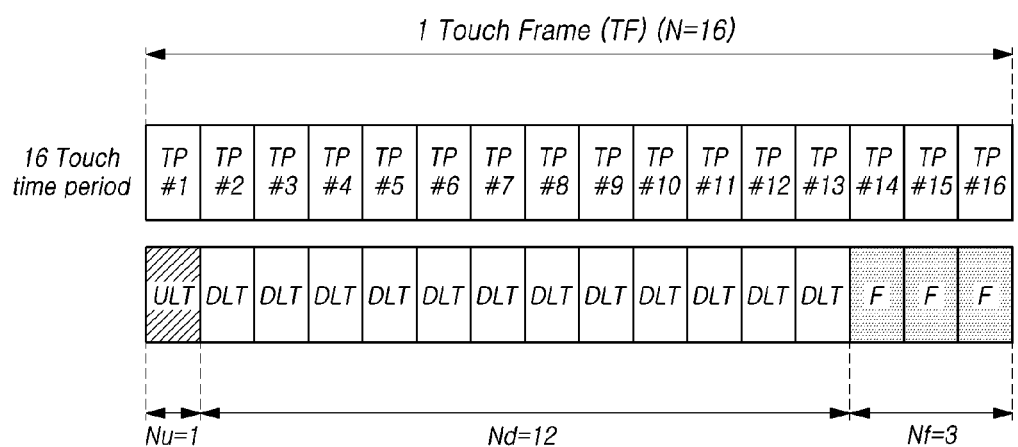
FIG. 8 is a diagram illustrating a configuration of N touch time periods within one touch frame time of a touch display device according to embodiments of the present disclosure.

For example, as shown in FIG. 8, the touch frame (TF) time may be the same as the display frame time. Alternatively, the touch frame (TF) time may be twice or ½ times the display frame time.

Referring to FIG. 7, when all 16 display driving time periods (DP #1 to DP #16) included in one display frame time are elapsed, one frame screen (display frame screen) is updated with respect to an entire area of the display panel 110.

Accordingly, each of the 16 display driving time periods (DP #1 to DP #16) included in one display frame time is time to drive display of an area corresponding to ¹⁄₁₆ of the display area of the display panel 110.

According to the time division driving method, each of the N touch time periods (TP #1 to TP #16) of one display frame time is a blank time. In the case of the time division driving method, N touch time periods (TP #1 to TP #16, N=16) are referred to as N long horizontal blank (LHB) time periods (LHB #1 to LHB #16).

Referring to FIG. 7, in the case of the time division driving method, the touch synchronization signal (Tsync) is a control signal that alternates a touch level signal period defining the timing of each of a plurality of touch time periods (TP #1 to TP #16), and a non-touch level signal period defining a plurality of display driving time periods (DP #1 to DP #16) corresponding to the non-touch period.

For example, as illustrated in FIG. 7, the touch level period may be a low level voltage period, and the non-touch level period may be a high level voltage period. Alternatively, the touch level period may be a high level voltage period, and the non-touch level period may be a low level voltage period.

FIG. 8 is a diagram illustrating a configuration of N touch time periods (TP #1 to TP #16, N=16) within one touch frame (TF) time of a touch display device according to embodiments of the present disclosure.

Referring to FIG. 8, during N touch time periods (TP #1 to TP #16) within one touch frame (TF) time, the touch circuit 300 of the touch display device 10 applies an uplink signal (ULS) to all or part of the plurality of touch electrodes (TE), and receives the downlink signal (DLS) output from one or more pens 20, which received the uplink signal (ULS) through the touch panel (TSP), through one or more touch electrodes (TE), thereby detecting the pen touch, applying a touch driving signal to all or part of the plurality of touch electrodes (TE), and detecting finger touch by detecting all or part of the plurality of touch electrodes (TE).

Referring to FIG. 8, N touch time periods (TP #1 to TP #16) within one touch frame (TF) time may include Nu uplink communication period (ULT), Nd downlink communication period (DLT), and Nf finger detection time period (F).

The Nu uplink communication period (ULT) is a touch time period in which an uplink signal (ULS) whose voltage level fluctuates irregularly or non-periodically is transmitted from the touch panel (TSP) to one or more pens 20. Here, the reason why the voltage level of the uplink signal (ULS) fluctuates irregularly or non-periodically is that the pen driving control information is expressed as the voltage level in the uplink signal (ULS).

The Nd downlink communication period (DLT) is a touch time period in which a downlink signal (DLS) is transmitted from one or more pens 20 to the touch panel (TSP). Here, the downlink signal (DLS) may be used for various purposes. Depending on the purpose of the downlink signal (DLS), the voltage level may fluctuate irregularly or non-periodically, and the voltage level may fluctuate regularly and periodically.

The Nf finger detection time period F is a touch time period for detecting a touch by the finger 30.

The sum of the number (Nu) of the uplink communication period (ULT), the number (Nd) of the downlink communication period (DLT), and the number (Nf) of the finger detection time period (F) is the same as the number (N) of the touch time period (TP #1 to TP #16) (N=Nu+Nd+Nf).

The number (Nu) of the uplink communication period (ULT) is one or more, the number (Nd) of the downlink communication period (DLT) is one or more, and the number (Nf) of finger detection time period (F) is one or more (Nu≥1, Nd≥1, Nf≥1).

The example of FIG. 8 is a case where N=16, Nu=1, Nd=12, and Nf=3. According to this example, among the N touch time periods (TP #1 to TP #16, N=16) within one touch frame (TF) time, one (Nu) touch time period (TP #1) is allocated as the uplink communication period (ULT), twelve (Nd) touch time periods (TP #2 to TP #13) are allocated as the downlink communication period (DLT), and three (Nf) touch time periods (TP #14~TP #16) are allocated as the finger detection time period (F).

Figure 9:
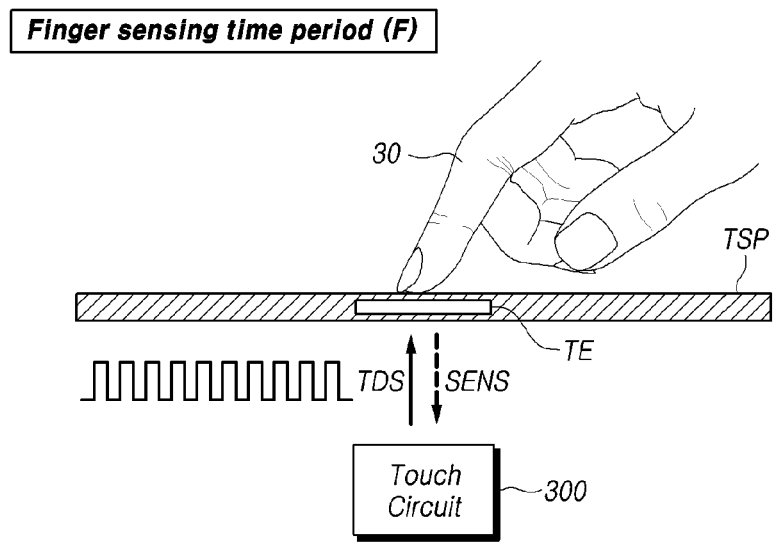
FIG. 9 is a diagram illustrating an operation of a touch display device, during a touch time period allocated as a finger sensing time period among N touch time periods within one touch frame time of a touch display device according to embodiments of the present disclosure.

FIG. 9 is a diagram illustrating an operation of a touch display device 10, during a touch time period (TP #14 to TP #16) allocated as a finger sensing time period (F) among N touch time periods (TP #1 to TP #16) within one touch frame (TF) time of a touch display device 10 according to embodiments of the present disclosure.

Referring to FIG. 9, during a touch time period (TP #14 to TP #16) allocated as the finger sensing period F, the touch circuit 300 applies a touch driving signal (TDS) to one or more touch electrodes (TE) in the touch panel (TSP).

Thereafter, the touch circuit 300 detects the touch sensing signal (SENS) through all or part of the plurality of touch electrodes (TE) in the touch panel (TSP), and may sense the self-capacitance between the touch electrode (TE) and the finger 30, or may sense the mutual-capacitance between the touch electrodes (TE).

The touch driving signal (TDS) may be a signal whose voltage level fluctuates by a certain amplitude. The frequency of the touch driving signal (TDS) may be uniform or variable.

When the touch driving signal (TDS) is applied to the touch electrode (TE), a signal (referred to as a load-free driving signal) corresponding to one or more of frequency, phase, and amplitude of the touch driving signal (TDS) may be applied to surrounding data lines (DL), the gate lines (GL), or other touch electrodes (TE). Through this, when sensing the finger touch, parasitic capacitance that lowers touch sensitivity may be prevented from being formed between the touch electrode (TE) and the surrounding patterns (DL, GL, TE).

Meanwhile, during the touch time period (TP #14 to TP #16) allocated as the finger sensing period F, when the touch driving signal (TDS) is applied to one or more touch electrodes (TE) in the touch panel (TSP), one or more pens 20 may output a signal (referred to as a pen load-free driving signal) corresponding to the frequency and phase of the touch driving signal (TDS) to the touch panel (TSP).

Figure 10:
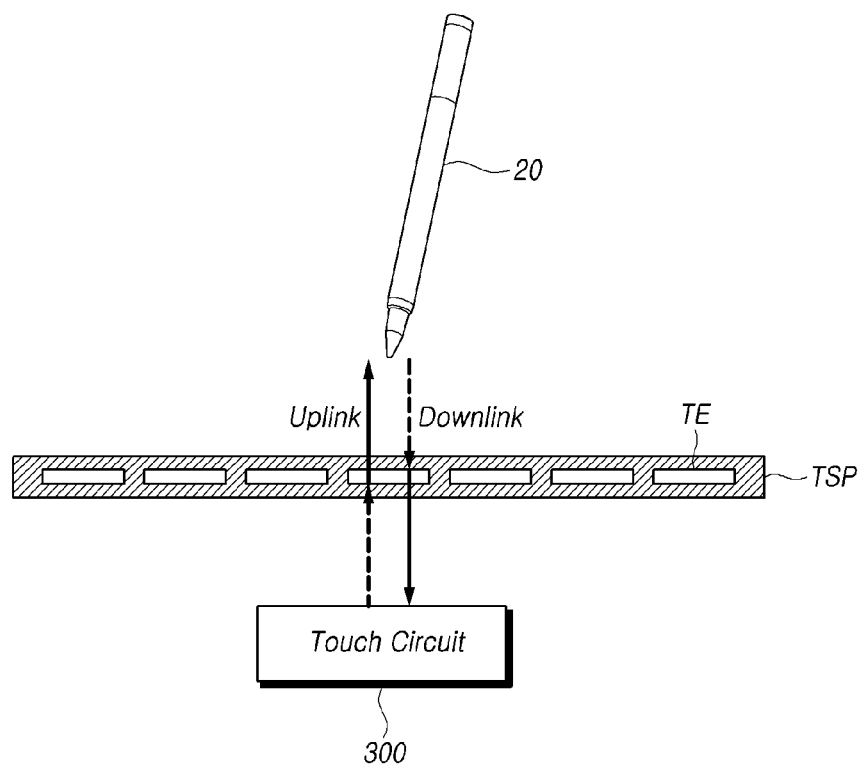
FIG. 10 is a diagram illustrating a bidirectional communication link between a touch display device and a pen according to embodiments of the present disclosure.

FIG. 10 is a diagram illustrating a bidirectional communication link (Uplink, Downlink) between the touch display device 10 and the pen 20 according to embodiments of the present disclosure.

Referring to FIG. 10, the path or channel from the touch panel (TSP) to the pen 20 is uplink, and the path or channel from the pen 20 to the touch panel (TSP) is downlink.

Referring to FIG. 10, for pen touch sensing, the touch display device 10 may supply an uplink signal (ULS) to the pen 20 through uplink. The pen 20 supplies a downlink signal (DLS) to the touch display device 10 through downlink.

Figure 11:
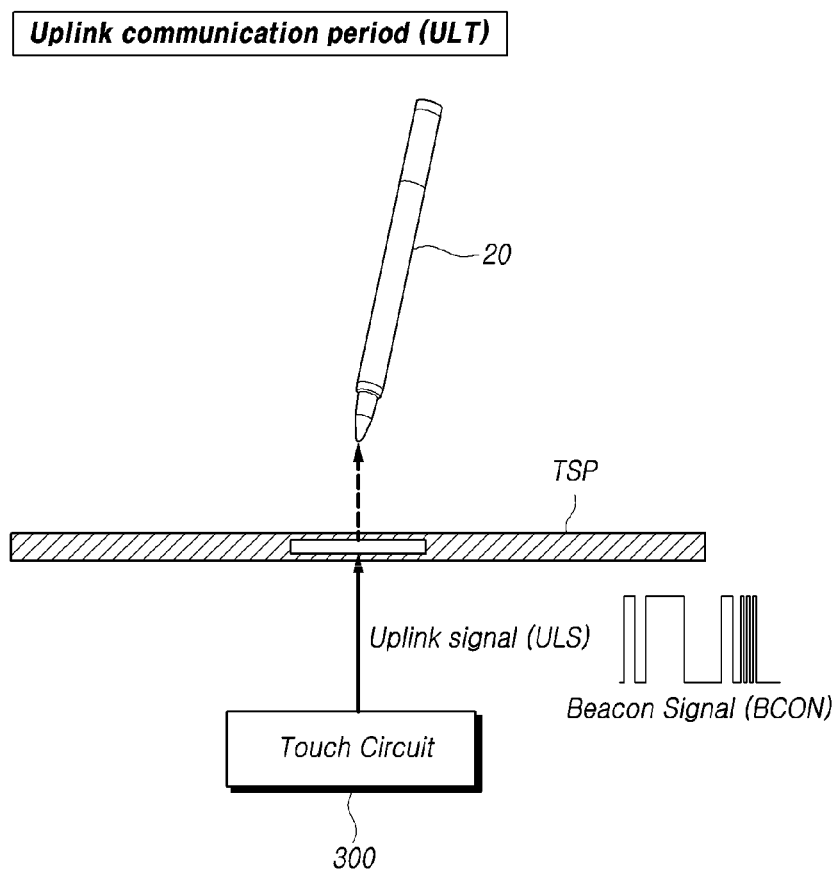
FIG. 11 is a diagram illustrating an operation of a touch display device and a pen, during a touch time period allocated as an uplink communication period among N touch time periods within one touch frame time of a touch display device according to embodiments of the present disclosure.

FIG. 11 is a diagram illustrating an operation of the touch display device 10 and the pen 20, during a touch time period (TP #1) allocated as an uplink communication period (ULT) among N touch time periods (TP #1 to TP #16) within one touch frame (TF) time of the touch display device 10 according to embodiments of the present disclosure.

Referring to FIG. 11, during the touch time period (TP #1) allocated as an uplink communication period (ULT), the touch circuit 300 may apply an uplink signal (ULS) to all or part of a plurality of touch electrodes (TE) in the touch panel (TSP).

Accordingly, one or more pens 20 that are in contact with or adjacent to the touch panel (TSP) may receive an uplink signal (ULS) applied to the touch electrode TE.

The uplink signal ULS may be used to inform necessary information to the pen 20 recognized by the touch display device 10 or any pen 20 not recognized by the touch display device 10.

When receiving an uplink signal (ULS), one or more pens 20 may control their own driving operation by using various information represented by the uplink signal (ULS).

The pen 20 recognized by the touch display device 10 may be a pen 20 which has already provided a pen unique ID to the touch display device 10, a pen 20 that the touch display device 10 has already given a pen temporary IDF, or a pen 20 paired with the touch display device 10, etc.

The pen 20 not recognized by the touch display device 10 may be a pen 20 which has not provided a pen unique ID to the touch display device 10, a pen 20 that the touch display device 10 has not yet given a pen temporary IDF, or a pen 20 not paired with the touch display device 10, etc.

The uplink signal (ULS) may be a beacon signal (BCON) that may include, for example, pen driving control information, and the like. In this case, the uplink communication period (ULT) may be referred to as a beacon transmission time period.

The beacon signal (BCON) may include one or more of touch panel type information (e.g., in-cell type, add-on type, etc.), touch time period information (LHB information), frequency information of a downlink signal (DLS), information on the number of pulses of downlink signal (DLS), information on the number of touch time period following the uplink communication period (ULT), and driving timing information.

The beacon signal (BCON) may further include power mode information (e.g., information on touch time period where a panel and a pen are not driven to reduce power consumption). The beacon signal (BCON) may further include information for driving synchronization between the touch panel (TSP) and the pen 20.

Various information included in the beacon signal (BCON) may be stored in the memory of the touch display device 10. Various information stored in the memory may be previously shared with the pen 20.

As described above, since the beacon signal (BCON) is an information signal that is used to express various information, the voltage level may fluctuate irregularly or non-periodically. The beacon signal (BCON) is an important control signal and may have larger amplitude in comparison with other signals.

Figure 12:
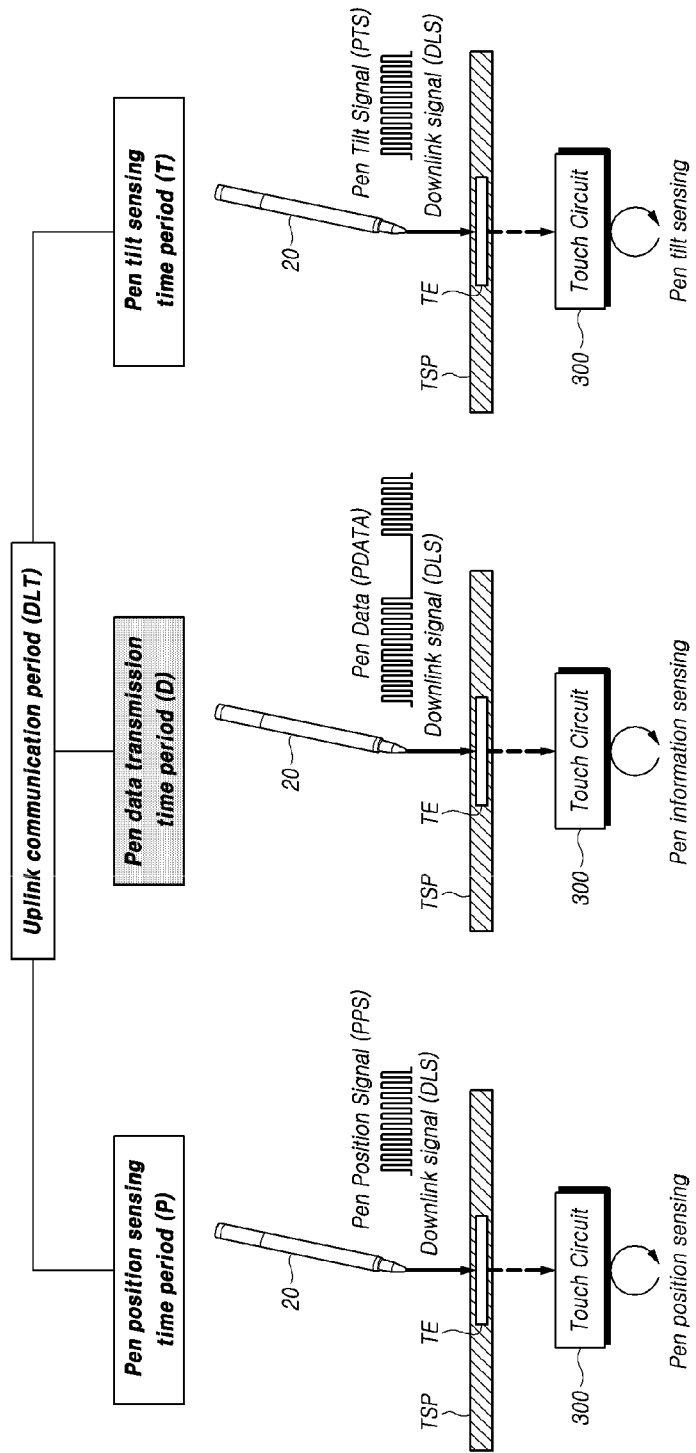
FIG. 12 is a diagram illustrating an operation of a touch display device and a pen, during a touch time period allocated as three downlink communication periods among N touch time periods within one touch frame time of a touch display device according to embodiments of the present disclosure.

FIG. 12 is a diagram illustrating an operation of the touch display device 10 and the pen 20, during a touch time period (TP #2 to TP #13) allocated as twelve downlink communication periods (DLT) among N touch time periods (TP #1 to TP #16) within one touch frame (TF) time of the touch display device 10 according to embodiments of the present disclosure.

A fact that the touch display device 10 senses a pen touch may mean that the touch display device 10 senses a pen position, a pen tilt, or various pen information.

Accordingly, the Nd downlink communication period (DLT) may include a pen position sensing time period (P) for sensing the pen position of the pen 20, a pen tilt sensing time period (T) for sensing the pen tilt of the pen 20, and a pen data transmission time period (D) for sensing pen information of the pen 20.

During the pen position sensing time period (P), the downlink signal (DLS) output from the pen 20 may be a pen position signal (PPS) whose voltage level fluctuates regularly or periodically.

The touch circuit 300 may sense the pen position by receiving the pen position signal (PPS) output from the pen 20 through one or more touch electrodes (TE).

During the pen tilt sensing time period (T), the downlink signal (DLS) output from the pen 20 may be a pen tilt signal (PTS) whose voltage level fluctuates regularly or periodically.

The touch circuit 300 may sense the pen tilt by receiving the pen tilt signal (PTS) output from the pen 20 through one or more touch electrodes (TE).

During the pen data transmission time period (D), since the downlink signal (DLS) output from the pen 20 indicates various pen information, it may be pen data (PDATA) whose voltage level may fluctuate regularly or periodically, but may fluctuate irregularly or non-periodically.

The touch circuit 300 may receive pen data (PDATA) output from the pen 20 through one or more touch electrodes (TE) and sense various pen information included in the pen data (PDATA).

For example, various pen information included in the pen data (PDATA) may include one or more input information (e.g., button input information, etc.) generated in the pen 20, pen driving state information, pen communication state information, pen battery information, and pen unique ID information, etc.

For example, various pen information included in the pen data (PDATA) may be expressed as a combination of two or more symbols, and each symbol may have two symbol values corresponding to two signal states, may have three symbol values corresponding to three signal states, or may have four or more symbol values corresponding to four or more signal states.

Meanwhile, the touch display device 10 and the pen 20 are interlocked, and in order for the touch display device 10 to sense the pen 20, the "pen protocol" between the touch display device 10 and the pen 20 must be predefined.

The pen protocol may define a driving method (e.g., a signal transmission method, etc.), a driving timing (e.g., a signal transmission timing, etc.) of each of the touch display device 10 and the pen 20, and the like, and may define the format of signal (ULS, DLS) exchanged between the touch display device 10 and the pen 20, the format of information included in the signal, and the like.

When a specific pen manufacturer manufactures a pen that operates with a specific pen protocol, in order for the touch display device 10 to sense a pen of a specific pen manufacturer, the touch display device 10 should also be able to operate with a specific pen protocol. To this end, hardware components are also provided to be suitable for a specific pen protocol.

In order for the touch display device 10 to interwork with various pens 20, it should be able to operate in accordance with the pen protocol with which each pen 20 operates, but the touch display device 10 can't change the operation method suitable for various pen protocols.

Since the touch driving circuit 410 may be designed and manufactured to be suitable for a specific pen protocol, in order for the touch display device 10 to interwork with various pens 20, it may include various touch driving circuit 410 manufactured to be suitable for various pen protocols.

In addition, even if the touch display device 10 is interworked with the pen 20 of the same manufacturer, since there is a predefined pen protocol, a type, driving timing, or driving method, etc for a predefined touch time period cannot be changed in the pen protocol.

As described above, due to hardware limitations and software limitations, the touch display device 10 may not be able to sense various pens 20 operating with various pen protocols, and may not be able to change the pen touch driving method or timing defined in the pen protocol.

Accordingly, the embodiments of the present disclosure provides a method for sensing various pens 20 operating with various pen protocols by adaptively setting various pen protocols, a method for setting various pen protocols without changing or adding the touch driving circuit 410 already manufactured as an integrated circuit, and a method for driving not only the pen 20 of one manufacturer, but also the pen 20 of various manufacturers by one touch driving circuit 410. This will be described in more detail below.

Figure 13:
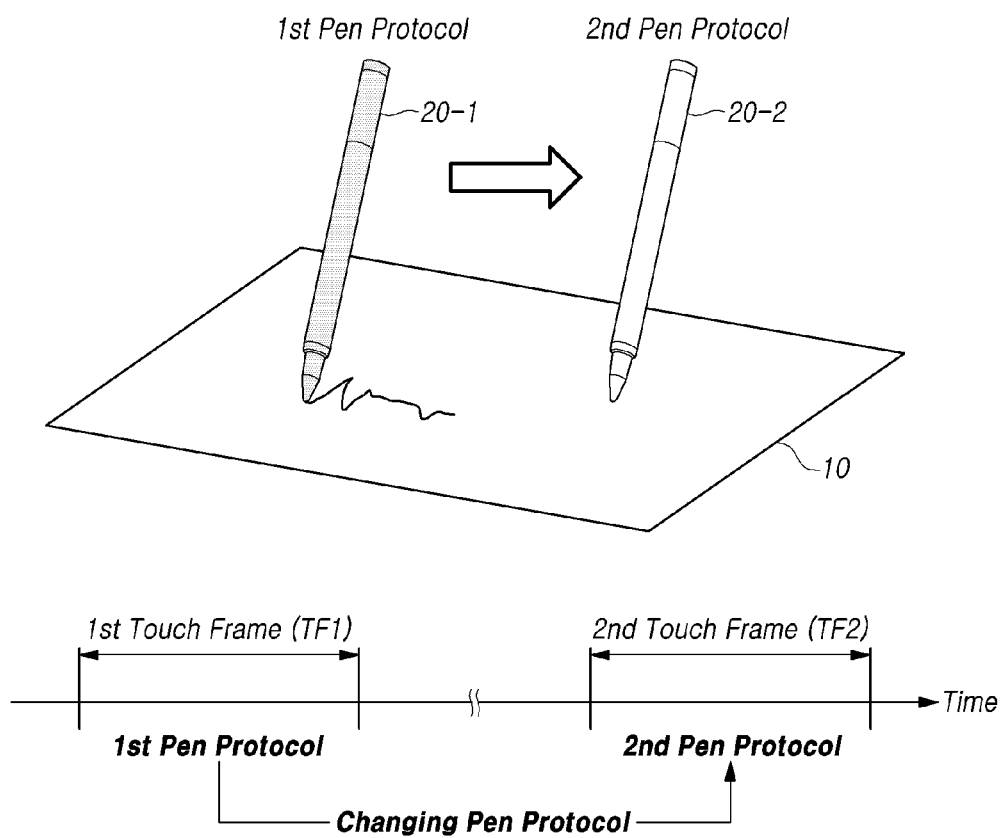
FIG. 13 is a diagram for explaining a function of changing a pen protocol of a touch display device according to embodiments of the present disclosure.

FIG. 13 is a diagram for explaining a function of changing a pen protocol of a touch display device 10 according to embodiments of the present disclosure.

Referring to FIG. 13, a first pen 20-1 operates with a first pen protocol, and a second pen 20-2 operates with a second pen protocol different from the first pen protocol.

Referring to FIG. 13, in order to sense the first pen 20-1 during the first touch frame TF1 time, the touch display device 10 operates to be suitable for the driving method and the driving timing according to the first pen protocol with which the first pen 20-1 operates, and must exchange signals (ULS, DLS) with the first pen 20-1 to be suitable for the format of a signal defined in the first pen protocol and the format of information included in the signal.

Referring to FIG. 13, in order to sense the second pen 20-2 different from the first pen 20-1 during the second touch frame (TF2) time, the touch display device 10 operates to be suitable for the driving method and the driving timing according to the second pen protocol with which the second pen 20-2 operates, and must exchange signals (ULS, DLS) with the second pen 20-2 to be suitable for a signal format defined in the second pen protocol.

Referring to FIG. 13, for this purpose, the touch display device 10 may perform a pen protocol setting function that changes a pen protocol in which the driving method, the driving timing, and the signal/information format are defined from the first pen protocol to the second pen protocol.

Figure 14:
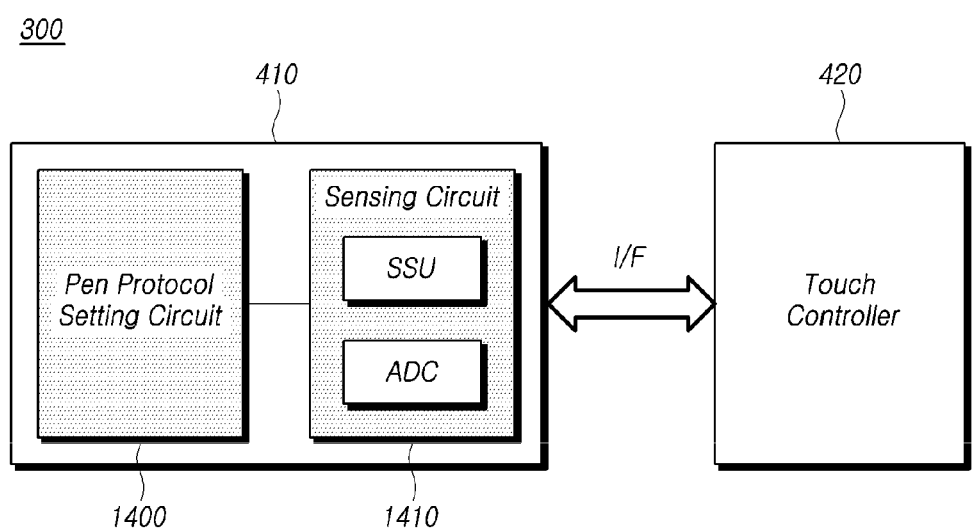
FIG. 14 is a block diagram of a touch circuit for a pen protocol change function of a touch display device according to embodiments of the present disclosure.

FIG. 14 is a block diagram of a touch circuit 300 for a pen protocol change function of a touch display device 10 according to embodiments of the present disclosure.

Referring to FIG. 14, the touch circuit 300 according to embodiments of the present disclosure may include a pen protocol setting circuit 1400 for setting a pen protocol, a sensing circuit 1410 for performing driving and sensing operation to be suitable for the set pen protocol, and the like.

The sensing circuit 1410 may supply the uplink signal (ULS) to one or more touch electrodes (TE) of the plurality of touch electrodes (TE), during one or more touch time periods set as uplink communication period (ULT) among the N touch time periods (TP #1 to TP #16) included in each of a plurality of touch frame (TF) times, include a sensing unit (SSU) for receiving a downlink signal (DLS) that is a pen signal through one or more touch electrodes (TE) of a plurality of touch electrodes (TE), during one or more touch time periods set as a downlink communication period (DLT) among N touch time periods (TP #1~TP #16), and include an analog-to-digital converter (ADC) that converts the analog sensing value corresponding to the downlink signal (DLS) received from the sensing unit (SSU) into a digital sensing value.

The pen protocol setting circuit 1400 may perform a pen protocol change function so that the sensing circuit 1410 operates according to the first pen protocol during the first touch frame time TF1 and the sensing circuit 1410 operates according to the second pen protocol during the second touch frame time TF2.

Figure 16:
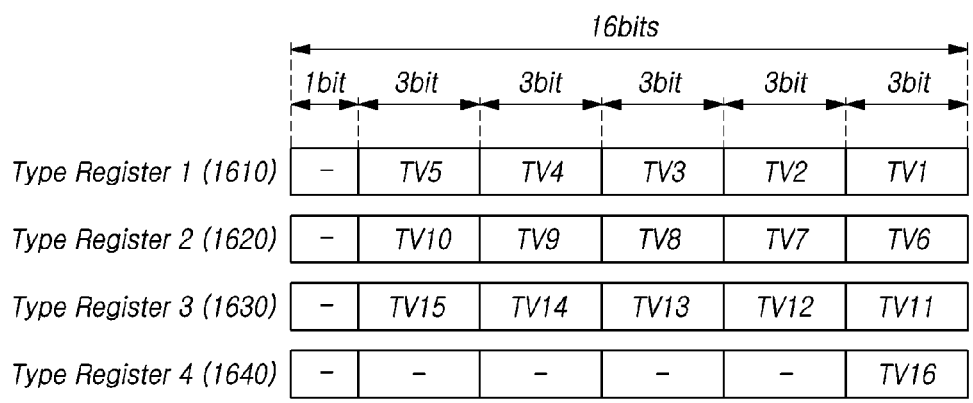
Figure 17:
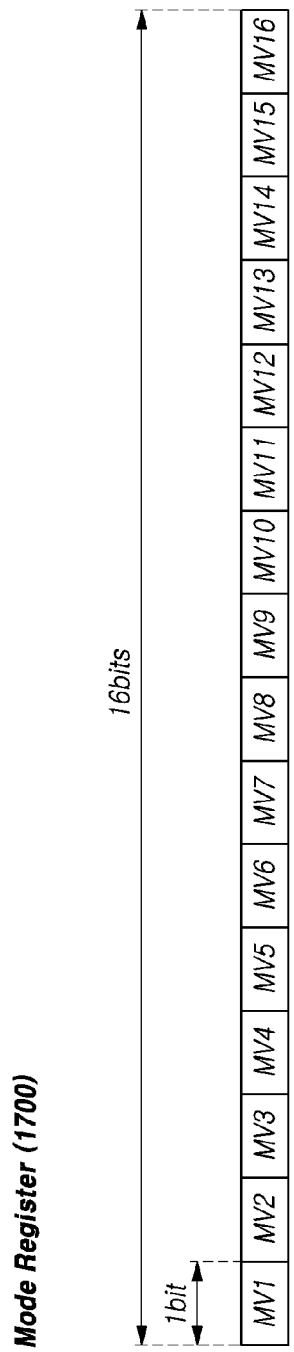

FIGS. 15 to 17 are diagrams illustrating a pen protocol setting table 1500 and two registers 1600 and 1700 of the touch circuit 300 according to embodiments of the present disclosure.

Referring to FIG. 15, the touch display device 10 according to embodiments of the present disclosure may provide a function of setting a pen protocol so as to change a pen protocol. The setting of the pen protocol may be a setting of various values (e.g., various values related to a driving method, a driving timing, a signal format, and an information format) that define the pen protocol.

Referring to FIG. 15, when setting the pen protocol, a pen protocol setting table 1500 including a set value (TV, MV) for each of a plurality of touch time periods (TP #1 to TP #16) within a touch frame (TF) time is generated.

Referring to FIG. 15, in the pen protocol setting table 1500, with respect to each of a plurality of touch time periods (TP #1 to TP #16) within a touch frame (TF) time, a type value (TV) for a type in which the touch circuit 300 operates in association with the pen 20, and a mode value (MV) for a mode in which the touch circuit 300 drives the touch panel (TSP) may be set.

Referring to FIG. 15, during each touch time period (TP #1 to TP #16) within a touch frame (TF) time, the touch circuit 300 may perform a driving operation associated with the pen 20 by one of various types that are used for pen touch sensing.

For example, during each touch time period (TP #1 to TP #16) within a touch frame (TF) time, the touch circuit 300 may perform a driving operation associated with the pen 20 by one of seven types (Type 1 to Type 7) that are used for pen touch sensing.

Referring to a type description table 1510 in FIG. 15, it will be described what are the seven types (Type 1 to Type 7) and what type values are set.

A first type (Type 1) may indicate a driving operation in which the touch circuit 300 transmits a beacon signal (BCON) to the pen 20 through the touch panel (TSP). The first type (Type 1) may indicate a case in which the touch circuit 300 does not perform a driving operation at all. The type value (TV) of the first type (Type 1) may be 1 in decimal and 001 (3 bits) in binary.

A second type (Type 2) may indicate a driving operation in which the touch circuit 300 senses two symbols during one touch period. The type value (TV) of the second type (Type 2) may be 2 in decimal and 010 (3 bits) in binary.

A third type (Type 3) may indicate a first frequency-based driving operation for measuring noise that exists when the touch circuit 300 senses the pen touch. The type value (TV) of the third type (Type 3) may be 3 in decimal and 011 (3 bits) in binary.

A fourth type (Type 4) may indicate a driving operation in which the touch circuit 300 senses four symbols during one touch time period. The type value (TV) of the fourth type (Type 4) may be 4 in decimal and 100 (3 bits) in binary.

A fifth type (Type 5) may indicate a second frequency-based driving operation for measuring the noise that exists when the touch circuit 300 senses the pen touch. The type value (TV) of the fifth type (Type 5) may be 5 in decimal and 101 (3 bits) in binary.

A sixth type (Type 6) may indicate a driving operation in which the touch circuit 300 senses six symbols during one touch time period. The type value (TV) of the sixth type (Type 6) may be 6 in decimal and 110 (3 bits) in binary.

A seventh type (Type 7) may indicate a driving operation in which the touch circuit 300 senses eight symbols during one touch time period. The type value (TV) of the seventh type (Type 7) may be 7 in decimal and 111 (3 bits) in binary.

Referring to FIG. 15, in the pen protocol setting table 1500, type values TV1 to TV16 for 16 touch time periods (TP #1 to TP #16) may be set. Each of the type values (TV1 to TV16) for 16 touch time periods (TP #1 to TP #16) is one of seven type values (TV).

Referring to FIG. 15, during each touch time period (TP #1 to TP #16) within a touch frame (TF) time, the touch circuit 300 may drive the touch panel (TSP) in different modes.

For example, during each touch time period (TP #1 to TP #16) within a touch frame (TF) time, the touch circuit 300 may drive the touch panel (TSP) in a DC mode, or may drive the touch panel (TSP) in a non-DC mode.

Referring to the mode description table 1520 of FIG. 15, when the touch circuit 300 drives the touch panel (TSP) in the DC mode, the touch circuit 300 may supply DC voltage to all or part of the plurality of touch electrodes TE in the touch panel (TSP). In this case, the mode value MV is 1. When the touch circuit 300 drives the touch panel (TSP) in the non-DC mode, the touch circuit 300 may supply the non-DC voltage to all or part of the plurality of touch electrodes TE in the touch panel (TSP) or stop the voltage supply. Here, the non-DC voltage may be a signal whose voltage level fluctuates. In this case, the mode value MV is 0.

Referring to FIG. 15, in the pen protocol setting table 1500, mode values (MV1 to MV16) for 16 touch time periods (TP #1 to TP #16) may be set. Each of the mode values (MV1 to MV16) for 16 touch time periods (TP #1 to TP #16) may be 1 which is a mode value (MV) indicating DC mode, or may be 0 which is a mode value (MV) indicating non-DC mode.

Referring to FIG. 16, the touch circuit 300 may further include a type register 1600 for storing the type value (TV1 to TV16) indicating the type of the driving operation of the touch circuit 300 associated with the pen 20, with respect to each of the N touch time periods (TP #1 to TP #16).

Referring to FIG. 16, as described above, when considering seven types (Type 1 to 7), each of type values (TV1 to TV16) corresponding to 16 touch time periods (TP #1 to TP #16) may be expresses by 3 bits. Accordingly, when there are 16 touch time periods (TP #1 to TP #16) within one touch frame (TF) time, the type register 1600 has a storage space for at least 48 bits (=16*3 bits).

Referring to FIG. 16, for efficient use and management, the type register 1600 may include first to fourth type registers 1610, 1620, 1630, and 1640. Each of the first to fourth type registers 1610, 1620, 1630, and 1640 may have a 16-bit storage space.

The first type register 1610 stores type values (TV1 to TV5) for five touch time periods (TP #1 to TP #5) in a 15-bit storage space, and further has a 1-bit free space.

The second type register 1620 stores type values (TV6 to TV10) for five touch time periods (TP #6 to TP #10) in a 15-bit storage space, and further has a 1-bit free space.

The third type register 1630 stores type values (TV11 to TV15) for five touch time periods (TP #11 to TP #15) in a 15-bit storage space, and further has a 1-bit free space.

The fourth type register 1640 stores type value (TV16) for one touch time period (TP #16) in a 3-bit storage space, and further has a 13-bit free space.

The touch circuit 300 may modify the type register 1600 between the first touch frame (TF1) time operating with the first pen protocol and the second touch frame (TF2) time operating with the second pen protocol.

Referring to FIG. 17, the touch circuit 300 may further include a mode register 1700 for storing a mode value (MV1 to MV16) indicating a mode for driving the touch panel (TSP), with respect to each of the N touch time period (TP #1 to TP #16).

Referring to FIG. 17, as described above, when considering two modes (DC mode, non-DC mode), each of mode values (MV1 to MV16) corresponding to 16 touch time periods (TP #1 to TP #16) may be represented by 1 bit. Accordingly, when there are 16 touch time periods (TP #1 to TP #16) within one touch frame (TF) time, the type register 1600 needs storage space for at least 16 bits (=16*1 bits).

The touch circuit 300 may modify the mode register 1700 between the first touch frame (TF1) time operating with the first pen protocol and the second touch frame (TF2) time operating with the second pen protocol.

Figure 18:
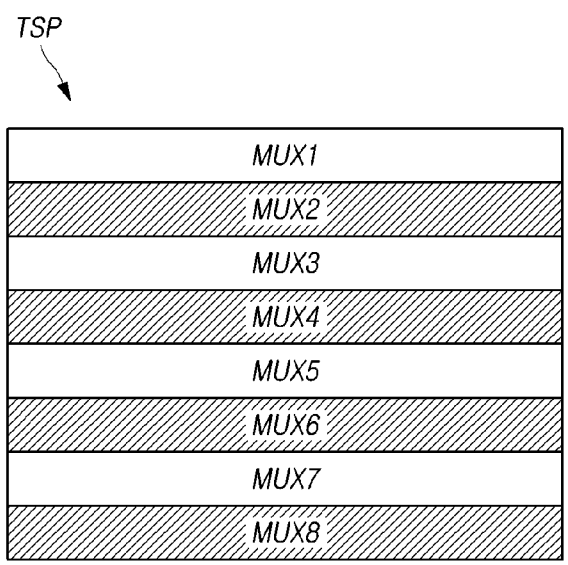
FIG. 18 is a diagram illustrating a driving group of a touch panel according to embodiments of the present disclosure.

FIG. 18 is a diagram illustrating a driving group of a touch panel (TSP) according to embodiments of the present disclosure.

Referring to FIG. 18, the plurality of touch electrodes (TE) disposed in the touch panel (TSP) may be grouped into multiple multiplexing driving groups (MUX1 to MUX8). Each of the multiple multiplexing driving groups (MUX1 to MUX8) may include one or more touch electrode rows.

Each of the multiple multiplexing driving groups (MUX1 to MUX8) is a group of touch electrodes (TE) sensed simultaneously. Each of the multiple multiplexing driving groups (MUX1 to MUX8) may be sensed at different times.

For example, the plurality of touch electrodes TE included in the first multiplexing group (MUX1) among multiple multiplexing driving groups (MUX1 to MUX8) may be simultaneously sensed in a first time zone by the touch driving circuit 410. For another example, the multiple touch electrodes (TE) included in the second multiplexing group (MUX2) among multiple multiplexing driving groups (MUX1 to MUX8) may be simultaneously sensed in a second time zone by the touch driving circuit 410.

Figure 19:
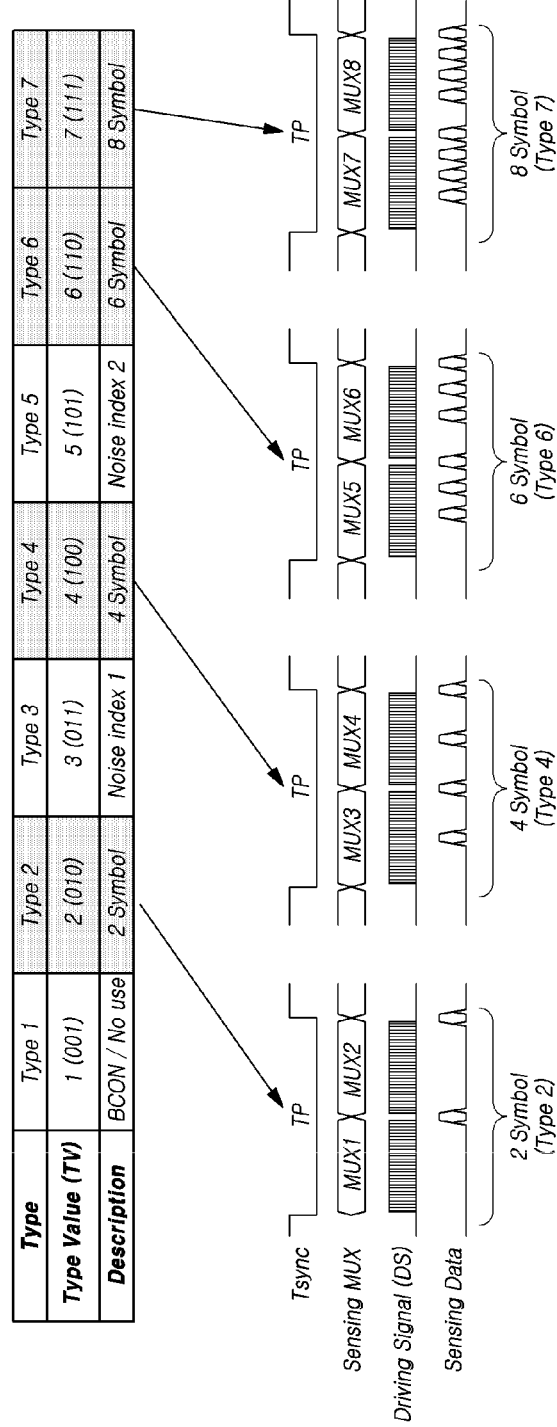
FIGS. 19 and 20 are diagrams for explaining seven types of each touch time period, when setting a pen protocol according to embodiments of the present disclosure.
Figure 20:
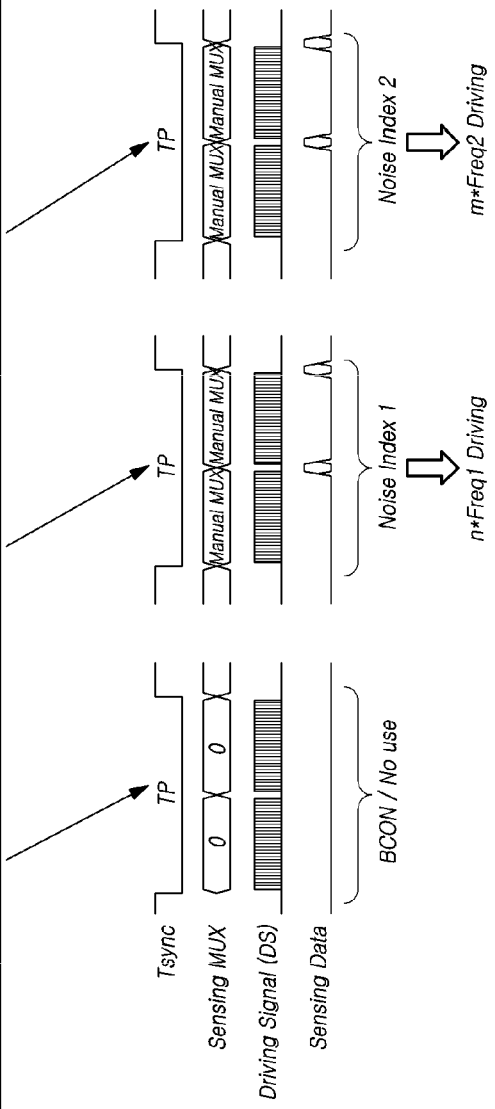

FIGS. 19 and 20 are diagrams for explaining seven types of each touch time period, when setting a pen protocol according to embodiments of the present disclosure.

FIG. 19 and FIG. 20 illustrate, when 7 touch time periods (TP) defined by the touch synchronization signal (Tsync) are set to 7 types (Type 1 to 7), a multiplexing driving group (Sensing MUX) sensed with respect to each of 7 touch time periods (TP) set to 7 types (Type 1 to 7), a driving signal (DS) applied to the touch electrodes (TE) included in the sensed multiplexing driving group (Sensing MUX), and sensing data sensed through the touch electrodes (TE) included in the sensed multiplexing driving group (Sensing MUX).

During one touch time period (TP), two multiplexing driving groups (MUX1, MUX2) may be sequentially sensed.

Referring to FIG. 19, during a touch time period (TP) set to a second type (Type 2), the touch circuit 300 may sense the pen signal, which is a downlink signal DLS, by sequentially sensing through two multiplexing driving groups (MUX1, MUX2), and thereby sense 2 symbols.

Referring to FIG. 19, during a touch time period (TP) set to a fourth type (Type 4), the touch circuit 300 may sense the pen signal, which is a downlink signal DLS, by sequentially sensing through two multiplexing driving groups (MUX3, MUX4), and thereby sense 4 symbols.

Referring to FIG. 19, during a touch time period (TP) set to a sixth type (Type 6), the touch circuit 300 may sense the pen signal, which is a downlink signal DLS, by sequentially sensing through two multiplexing driving groups (MUX5, MUX6), and thereby sense 6 symbols.

Referring to FIG. 19, during a touch time period (TP) set to a seventh type (Type 7), the touch circuit 300 may sense the pen signal, which is a downlink signal DLS, by sequentially sensing through two multiplexing driving groups (MUX7, MUX8), and thereby sense 8 symbols.

Referring to FIG. 20, during a touch time period TP set to a first type (Type 1), the touch circuit 300 may supply a beacon signal (BCON), which is an uplink signal ULS, to the touch panel (TSP). At this time, the pen 20 adjacent to or in contact with the touch panel (TSP) may receive a beacon signal (BCON) through one or more touch electrodes (TE).

The touch time period (TP) set to the first type (Type 1) is a period for providing a beacon signal (BCON) to the pen 20, but not a period for sensing the pen signal. Therefore, during the touch time period (TP) set to the first type (Type 1), there is no sensed multiplexing driving group (Sensing MUX→0), and no sensing data.

Referring to FIG. 20, the touch circuit 300 may set one or more touch time periods among N touch time periods included in each touch frame time to a first noise index (Noise Index 1) period corresponding to the third type (Type 3), and set one or more other touch time periods among N touch time periods to a second noise index (Noise Index 2) period corresponding to a fifth type (Type 5).

The first noise index period and the second noise index period mentioned above may be a period for measuring noise that exists during pen touch sensing.

During one or more touch time periods (TP) set to the first noise index (Noise Index 1) period corresponding to the third type (Type 3), the touch circuit 300 may supply a driving signal (DS) having an integer (n) times (n*Freq1) a first frequency (Freq1) to one or more of the plurality of touch electrodes.

During one or more touch time periods (TP) set to the second noise index (Noise Index 2) period corresponding to the fifth type (Type 5), the touch circuit 300 may supply a driving signal (DS) having an integer (m) times (m*Freq1) a second frequency (Freq2) to one or more of the plurality of touch electrodes.

During one or more touch time periods (TP) set to the first noise index (Noise Index 1) period corresponding to the third type (Type 3), the touch circuit 300 may sense the multiplexing driving group (Manual MUX) selected by the manual method.

During one or more touch time periods (TP) set to the second noise index (Noise Index 2) period corresponding to the fifth type (Type 5), the touch circuit 300 may sense the multiplexing driving group (Manual MUX) selected by the manual method.

The multiplexing driving group (Manual MUX) selected by the manual method may include multiple multiplexing driving groups among a plurality of multiplexing driving groups (MUX1 to MUX8). Alternatively, the multiplexing driving group (Manual MUX) selected by the manual method may include multiple touch electrodes (TE) randomly selected from among the plurality of touch electrodes (TE) disposed in the touch panel (TSP).

The touch circuit 300 may measure noise caused by the pen signal by supplying the driving signal of a first measurement frequency (integer multiple of the first frequency, n*Freq1) during the first noise index period (third type) among the touch frame time, and measure noise caused by the pen signal by supplying the driving signal of a second measurement frequency (integer multiple of the second frequency, m*Freq2) during the second noise index period (fifth type). The touch circuit 300 may determine a noise-resistant frequency among the first measurement frequency and the second measurement frequency according to the noise measurement result, and may drive the touch panel (TSP) during the touch time period set to second, fourth, sixth, seventh types (Type 2, 4, 6, 7) within the next touch frame time by using the driving signal (DS) having the determined frequency.

Figure 21:
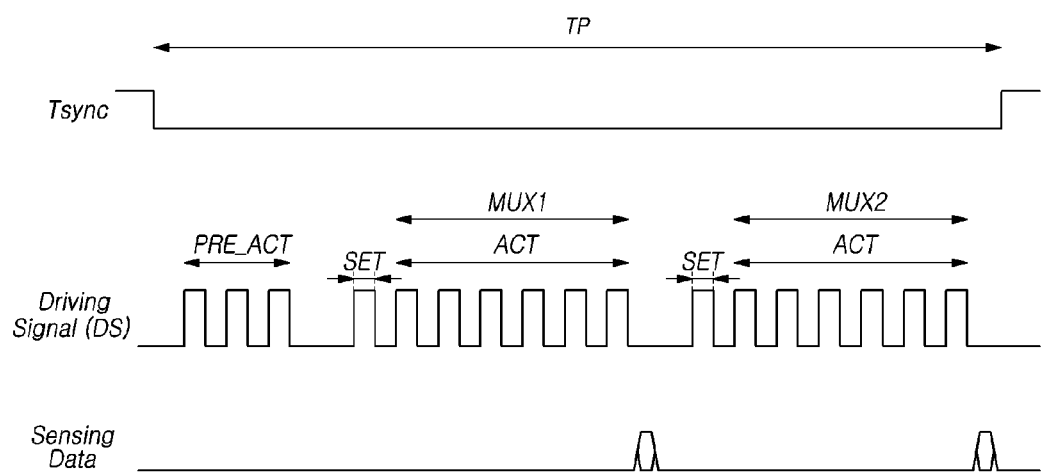
FIG. 21 is a diagram illustrating pulses of a driving signal applied to a touch electrode in a touch display device according to embodiments of the present disclosure.

FIG. 21 is a diagram illustrating pulses of a driving signal (DS) applied to the touch electrode (TE) in the touch display device 10 according to embodiments of the present disclosure. However, it is assumed that during one touch time period (TP), two multiplexing driving groups (MUX1, MUX2) are sensed.

Referring to FIG. 21, during one touch time period (TP), the driving signal DS may include an active pulse period (ACT) that is actually used for sensing, and may further include a set pulse period (SET) and a pre-active pulse period (PRE_ACT).

The active pulse period (ACT) may include a plurality of pulses that are actually sensed. Sensing data may be generated by sensing during the active pulse period (ACT).

The set pulse period (SET) may include one or more pulses, and may be positioned before the timing at which each of the multiplexing driving groups (MUX1, MUX2) is sensed within one touch time period (TP). That is, the set pulse period (SET) may precede the active pulse period (ACT) positioned at a timing at which each of the multiplexing driving groups (MUX1, MUX2) is sensed. The set pulse period (SET) may serve to inform the start of the multiplexing driving groups (MUX1, MUX2), and may serve to stably sense each of the multiplexing driving groups (MUX1, MUX2).

The pre-active pulse period (PRE_ACT) may come in front of one touch time period (TP). The pre-active pulse period (PRE_ACT) may serve to indicate the start of one touch time period (TP), may serve to stabilize the touch driving switched from the display driving, and in some cases, may also serve as a ping signal that is a synchronization signal.

From a temporal sequence point of view, the pre-active pulse period (PRE_ACT) comes, and then, the set pulse period (SET) and the active pulse period (ACT) come in correspondence with the sensing timing of the first multiplexing driving group (MUX1), and the set pulse period (SET) and the active pulse period (ACT) may come in correspondence with the sensing timing of the second multiplexing driving group (MUX12).

Figure 22:
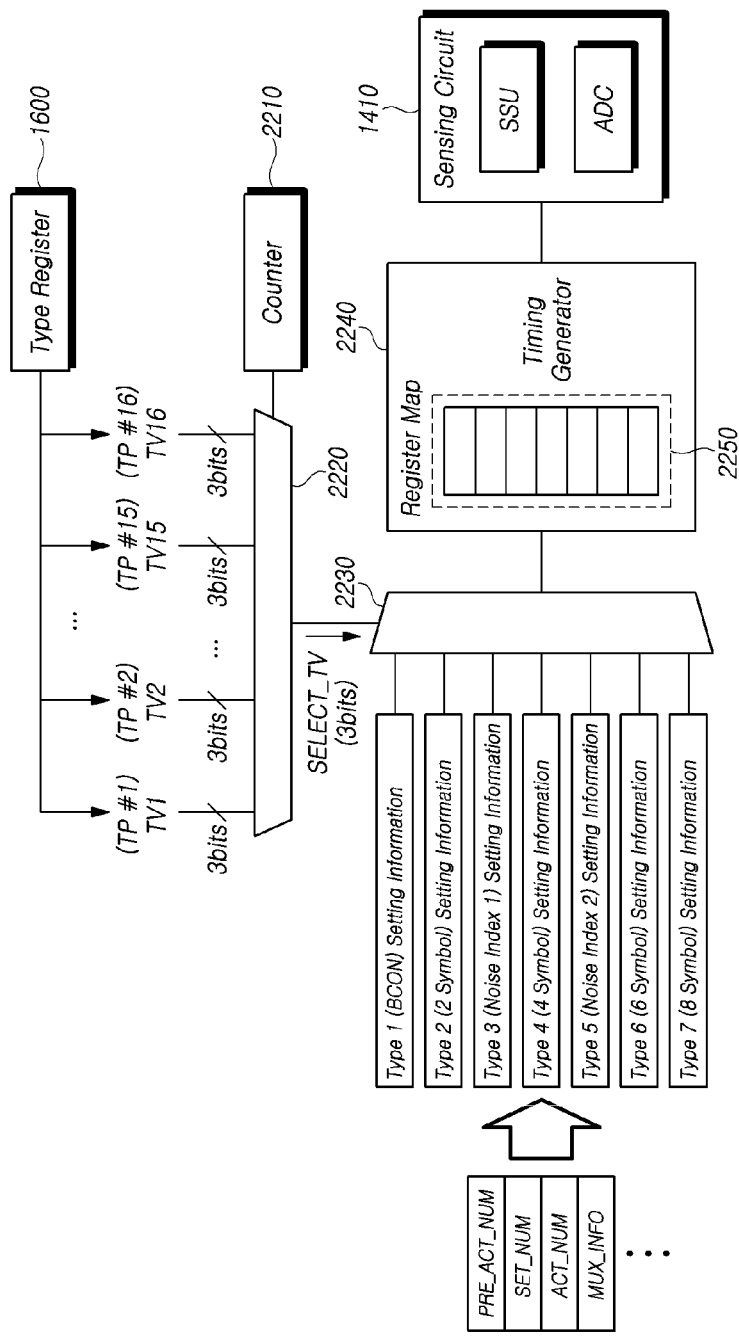
FIG. 22 is a diagram for explaining a process of setting a type of each touch time period, when setting a pen protocol according to embodiments of the present disclosure.

FIG. 22 is a diagram for explaining a process of setting a type of each touch time period (TP), when setting a pen protocol according to embodiments of the present disclosure.

Referring to FIG. 22, a pen protocol setting circuit 1400 may include a counter 2210 for outputting identification information of a touch time period (TP) to be currently driven, a type value output multiplexer 2220 for outputting a type value (TV) previously associated with respect to a corresponding touch time period (TP) as a type value selection signal (SELECT_TV) according to the identification information of the touch time period (TP) output from the counter 2210, a setting information output multiplexer 2230 for outputting setting information for the type (one of seven types) of a corresponding touch time period, according to the type value selection signal (SELECT_TV), which is one of the type values (TV1 to TV16) for a plurality of touch time periods (TP #1 to TP #16), a timing generator 2240 including a type register map 2250 for storing setting information output from the setting information output multiplexer 2230, and the like.

The setting information for the seven types (Type 1 to 7) may include one or more among the number of pulses (PRE_ACT_NUM) in the pre-active pulse period (PRE_ACT), the number of pulses (SET_NUM) in the set pulse period (SET), the number of pulses (ACT_NUM) in the active pulse period (ACT), multiplexing driving group information (MUX_INFO), etc., in the driving signal DS.

The sensing circuit 1410 in the touch driving circuit 410 may use setting information stored in the type register map 2250 of the timing generator 2240 to drive the touch time period TP to be currently driven.

In the below, it is described by way of an example. It is assumed that the touch time period TP to be currently driven is the first touch time period TP #1, and the first touch time period TP #1 is set to the first type (Type 1).

The counter 2210 outputs identification information of the first touch time period (TP #1) to be currently driven.

The type value output multiplexer 2220 outputs 001 (3 bits), which is a type value (TV1) previously associated with respect to a corresponding first touch time period (TP #1), as a type value selection signal (SELECT_TV) according to the identification information of the first touch time period (TP #1) output from the counter 2210.

The setting information output multiplexer 2230 may output the setting information for the first type (Type 1) of a corresponding first touch time period (TP #1), according to 001 (3 bits) which is a type value (TV1) corresponding to the type value selection signal (SELECT_TV).

The timing generator 2240 stores setting information for the first touch time period TP #1 output from the setting information output multiplexer 2230 in the type register map 2250.

Figure 23:
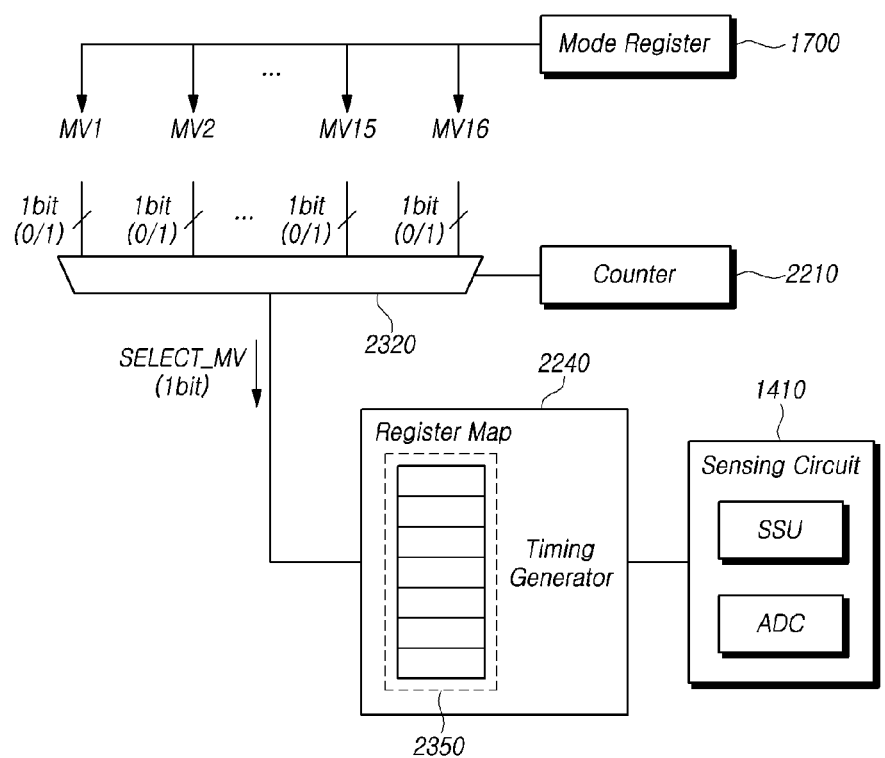
FIG. 23 is a diagram for explaining a process of setting a mode of each touch time period, when setting a pen protocol according to embodiments of the present disclosure.

FIG. 23 is a diagram for explaining a process of setting a mode of each touch time period (TP), when setting a pen protocol according to embodiments of the present disclosure.

Referring to FIG. 23, the pen protocol setting circuit 1400 may include a counter 2210 for outputting identification information of a touch time period (TP) to be currently driven, a mode value output multiplexer 2320 that outputs a 1-bit mode value (MV, 0 or 1) previously associated with respect to a corresponding touch time period (TP) as a mode value selection signal (SELECT_MV) according to the identification information of the touch time period (TP) output from the counter 2210, a timing generator 2240 including a mode register map 2350 for storing the mode value selection signal (SELET_MV) output from the mode value output multiplexer 2320, etc.

FIG. 24 is a diagram illustrating setting of a first pen protocol according to a method of setting a pen protocol according to embodiments of the present disclosure.

Referring to FIG. 24, an operation mode for sensing a pen touch may include a full scan mode for sensing an entire area of the touch panel (TSP) for pen searching, and a local scan mode for sensing a local area of the touch panel (TSP) to sense a pen position for the pen 20 and pen data.

According to the first pen protocol for the full scan mode, the first and eighth touch time periods (TP #1, 8) among 16 touch time periods (TP #1 to TP #16) are a period in which the beacon signal (BCON) is applied to the plurality of touch electrodes (TE) in the touch panel (TSP), and the remaining second to seventh and the ninth to sixteenth touch time periods (TP #2 to TP #7, TP #9~TP #16) are a period in which a ping signal, which is a driving signal (DS) whose voltage level is periodically changed, is applied to a plurality of touch electrodes (TE) in the touch panel (TSP).

During the first and eighth touch time periods (TP #1 and 8), when the new pen 20 approaches the touch panel (TSP), the new pen 20 receives a beacon signal (BCON). During the second to seventh, the ninth to sixteenth touch time periods (TP #2 to TP #7, TP #9 to TP #16), the new pen 20 outputs a pen signal that is a downlink signal (DLS). Accordingly, the touch circuit 300 recognizes the new pen 20.

According to the first pen protocol for the full scan mode, during the first and eighth touch time periods (TP #1, 8) among 16 touch time periods (TP #1 to TP #16), the beacon signal (BCON) applied to the plurality of touch electrodes (TE) in the touch panel (TSP) is a non-DC voltage, and may not fluctuate on a cycle as it contains some information whereas the voltage level fluctuates.

According to the first pen protocol for the full scan mode, during the second to seventh, the ninth to sixteenth touch time periods (TP #2-7, 9-16) among 16 touch time periods (TP #1 to TP #16), a non-DC voltage is applied to the plurality of touch electrodes (TE) in the touch panel (TSP). Here, the non-DC voltage is a driving signal (DS) corresponding to a touch driving signal for sensing a finger touch (finger position), and may be a signal whose voltage level fluctuates periodically.

According to the first pen protocol for the local scan mode, among 16 touch time periods (TP #1 to TP #16), the first touch time period (TP #1) is a period during which a beacon signal (BCON) is applied to a plurality of touch electrodes (TE) in the touch panel (TSP), the second, fifth, ninth, and thirteenth touch time periods (TP #2, TP #5, TP #9, and TP #13) are periods for sensing the pen position of the searched pen 20, the third, sixth, seventh, tenth, eleventh, fourteenth, and fifteenth touch time periods (TP #3, TP #6, TP #7, TP #10, TP #11, TP #14, and TP #15) are periods for sensing the pen data of the searched pen 20, and the fourth, eighth, twelfth, and sixteenth touch time periods (TP #4, TP #8, TP #12, and TP #16) are periods for sensing a finger touch (finger position).

According to the first pen protocol for the local scan mode, during the first touch time period (TP #1) for transmitting the beacon signal (BCON), the beacon signal (BCON) applied to the plurality of touch electrodes (TE) in the touch panel (TSP) is a non-DC voltage, and may not fluctuate on a cycle as it contains some information whereas the voltage level fluctuates. During the second and third, fifth to seventh, ninth to eleventh, thirteenth to fifteenth touch time periods (TP #2-3, 5-7, 9-11, 13-15) for sensing the pen position and pen data, DC voltage is applied to all or part of the plurality of touch electrodes (TE) in the touch panel (TSP). During the fourth, eighth, twelfth, sixteenth touch time period (TP #4, 8, 12, 16) for sensing the finger position, non-DC voltage is applied to all or part of the plurality of touch electrodes (TE) in the touch panel (TSP). Here, the non-DC voltage is a driving signal (DS) corresponding to a touch driving signal for sensing a finger touch (finger position), and may be a signal whose voltage level fluctuates periodically.

In order to implement the above-described first pen protocol, through the pen protocol setting, the pen protocol setting circuit 1400 of the touch circuit 300 may generate a pen protocol setting table 1500 for full scan mode, and a pen protocol setting table 1500 for a local scan mode.

First, a setting method for the first pen protocol for a full scan mode will be described.

Among 16 touch time periods (TP #1 to TP #16), the type value (TV1, TV8) for the first and eighth touch time periods (TP #1, 8) is set to 1 (001) that is the type value of the first type (BCON).

The type values (TV2~TV7, TV9~TV16) for the second to seventh and the ninth to sixteenth touch time periods (TP #2 to TP #7, TP #9 to TP #16) among 16 touch time periods (TP #1 to TP #16) may be set to 2 (010) which is a type value of the second type (2 Symbol).

The mode values (MV1 to MV16) for 16 touch time periods (TP #1 to TP #16) are set to 0 which is a mode value indicating a non-DC mode.

Next, a setting method for a first pen protocol for a local scan mode will be described.

Among 16 touch time periods (TP #1 to TP #16), the type value (TV1) for the first touch time period (TP #1) is set to 1(001) which is the type value of a first type indicating a transmission period of the beacon signal (BCON).

Among 16 touch time periods (TP #1 to TP #16), the type values (TV2, TV5, TV9, and TV13) for the second, fifth, ninth, and thirteenth touch time periods (TP #2, TP #5, TP #9, and TP #13) are set to 2(010) which is the type value of the second type (2 symbol).

Among 16 touch time periods (TP #1 to TP #16), the type values (TV3, TV6, TV10, and TV14) for the third, sixth, tenth, and fourteenth touch time periods (TP #3, TP #6, TP #10, TP #14) are set to 4(100) which is a type value of the fourth type (4 symbol).

Among 16 touch time periods (TP #1 to TP #16), type values (TV7, TV11, TV15) for seventh, eleventh, and fifteenth touch time periods (TP #7, TP #11, TP #15) are set to 6(110) which is a type value of the sixth type (6 symbol).

The mode value (MV1) for the first touch time period (TP #1) corresponding to the transmission period of the beacon signal (BCON) is set to 0 which is a mode value indicating a non-DC mode.

The mode values (MV4, MV8, MV12, MV16) for the fourth, eighth, twelfth, and sixteenth touch time periods (TP #4, 8, 12, 16) for sensing the finger position is set to 0 which is a mode value indicating a non-DC mode.

The mode values (MV2, MV3, MV5 to MV7, MV9 to MV11, and MV13 to MV15] for the second and third, the fifth to seventh, the ninth to eleventh, the thirteenth to fifteenth (TP #2-3, 5-7, 9-11, 13-15) touch time periods for sensing pen position and pen data are set to 1 which is a mode value indicating a DC mode.

As described above, the first pen protocol may be implemented by setting the type values and mode values for the first to sixteenth touch time periods (TP #1 to TP #16).

FIG. 25 is a diagram illustrating setting of a second pen protocol according to a method of setting a pen protocol according to embodiments of the present disclosure.

Referring to FIG. 25, an operation mode for sensing a pen touch includes a full scan mode for sensing an entire area of the touch panel (TSP) for pen searching, and a local scan mode for sensing a local area of the touch panel (TSP) to sense the pen position and pen data for the pen 20.

According to the first pen protocol for the full scan mode, among 16 touch time periods (TP #1 to TP #16), the first and ninth touch time periods (TP #1, 9) are periods in which the beacon signal (BCON) is applied to a plurality of touch electrodes (TE) in the touch panel (TSP). The 2nd to 5th, 10th to 13th touch time periods (TP #2~TP #5, TP #10~TP #13) are periods for sensing the finger and the pen position. The 6th to 8th and 14th to 16th touch time periods (TP #6 to TP #8, TP #14 to TP #16) are dummy periods and are not used.

According to the second pen protocol for the full scan mode, during the first and ninth touch time periods (TP #1, TP #9) among 16 touch time periods (TP #1 to TP #16), the beacon signal (BCON) applied to the plurality of touch electrodes (TE) in the touch panel (TSP) is a non-DC voltage, and may not fluctuate on a cycle as it contains some information whereas the voltage level fluctuates.

During the second to fifth, the tenth to thirteenth touch time periods (TP #2-5, 10-13), a non-DC voltage is applied to the plurality of touch electrodes (TE) in the touch panel (TSP). Here, the non-DC voltage is a driving signal (DS) corresponding to a touch driving signal for sensing a finger touch (finger position), and may be a signal whose voltage level fluctuates periodically. During the sixth to eighth, the fourteenth to sixteenth touch time periods (TP #6~TP #8, TP #14~TP #16), the touch panel (TSP) may not be driven.

According to the second pen protocol for the local scan mode, among 16 touch time periods (TP #1~TP #16), the first and ninth touch time periods (TP #1, TP #9) are periods during which a beacon signal (BCON) is applied to a plurality of touch electrodes (TE) in the touch panel (TSP), the second to fifth touch time periods (TP #2~TP #5) are periods for sensing the finger position and the pen position searched in the full scan mode, the seventh and eighth, the tenth to sixteenth touch time periods (TP #7, TP #8, TP #10~TP #16) are period for sensing the pen data of the pen 20 searched in the full scan mode, and the sixth touch time period (TP #6) is a dummy period.

According to the second pen protocol for the local scan mode, during the first and ninth touch time periods (TP #1, TP #9) for transmitting a beacon signal (BCON), the beacon signal (BCON) applied to the plurality of touch electrodes (TE) in the touch panel (TSP) is a non-DC voltage, and may not fluctuate on a cycle as it contains some information whereas the voltage level fluctuates.

Regardless of the finger, as periods for sensing only the pen 20, during the 7th and 8th, 10th-16th touch time periods (TP #7, TP #8, TP #10~TP #16) for sensing the pen data, a DC voltage is applied to all or part of the plurality of touch electrodes (TE) in the touch panel (TSP).

As periods related to the finger, during the 2nd to 5th touch time periods (TP #2 to TP #5) for sensing the finger and the pen position, a non-DC voltage is applied to all or part of the plurality of touch electrodes (TE) in the touch panel (TSP). Here, the non-DC voltage is a driving signal (DS) corresponding to a touch driving signal for sensing a finger touch (finger position), and may be a signal whose voltage level fluctuates periodically.

During the sixth touch time period (TP #6) that is a dummy period, the touch panel (TSP) may not be driven.

In order to implement the above-described second pen protocol, the pen protocol setting circuit 1400 of the touch circuit 300 may generate a pen protocol setting table 1500 for a full scan mode, and a pen protocol setting table 1500 for a local scan mode, through the pen protocol setting.

First, a setting method for the second pen protocol for a full scan mode will be described.

The type value (TV1, TV9) for the first and ninth touch time periods (TP #1, 9) corresponding to the transmission period of the beacon signal (BCON) among 16 touch time periods (TP #1~TP #16) is set to 1(001) which is a type value of the first type (BCON).

The mode value (MV1, MV9) for the first and ninth touch time periods (TP #1, 9) corresponding to the transmission period of the beacon signal (BCON) among 16 touch time periods (TP #1 to TP #16) is set to 0 which is a mode value indicating a non-DC mode.

The type value (TV6~8, TV14~16) for the 6th to 8th, the 14th to 16th touch time periods (TP #6~8, TP #14~16) which are a dummy period among 16 touch time periods (TP #1~TP #16) is set to 1(001), which is a type value of the first type (No Use).

The mode value (MV6~8, MV14~16) for the 6th to 8th, the 14th to 16th touch time periods (TP #6~8, TP #14 to 16), which are a dummy period, among 16 touch time periods (TP #1~TP #16) is not set to both the mode value (1) indicating the DC mode and the mode value (0) indicating the non-DC mode.

Among 16 touch time periods (TP #1~TP #16), the type values (TV2~TV5, TV10~13) for the 2nd~5th, 10th~13th touch time periods (TP #2~5, TP #10~13), which are the finger and pen position sensing periods, are set to 2(010) which is the type value of the second type (2 Symbol).

Among 16 touch time periods (TP #1~TP #16), the mode values (MV2~5, MV10~13) for the 2nd~5th, 10th~13th touch time periods (TP #2~5, TP #10~13), which are the finger and pen position sensing periods, are set to 0 which is a mode value indicating a non-DC mode.

Next, a setting method for a second pen protocol for a local scan mode will be described.

Among 16 touch time periods (TP #1 to TP #16), the type value (TV1, TV9) for the first and ninth touch time periods (TP #1, 9), which are transmission periods of the beacon signal (BCON), is set to 1(001), which is a type value of the first type. Among 16 touch time periods (TP #1 to TP #16), the type value (TV6) for the sixth touch time period (TP #6) that is a dummy period is set to 1(001) which is a type value of the first type.

Among 16 touch time periods (TP #1 to TP #16), the type values (TV2 to 5) for the second to fifth touch time periods (TP #2~5), which are the finger and pen position sensing periods, are set to 2(010) which is a type value of the second type (2 Symbol).

Among 16 touch time periods (TP #1~TP #16), the 7th, the 10th to 11th, and the 13th to 15th touch time periods (TP #7, 10~11, 13~15), among the 7th, the 8th, and 10th to 16th touch time periods (TP #7, 8, and 10~16) which are a pen data sensing period, are set to 6(110), which is the type value of the sixth type (6 Symbol), and the 8th, 12nd, and 16th touch time periods (TP #8, 12, 16) are set to 2(010) which is a type value of the second symbol (2 Symbol).

According to the second pen protocol for the local scan mode, the mode values (MV1, MV9) for the first and ninth touch time periods (TP #1, TP #9), which are a beacon signal (BCON) transmission period, are set to a mode value 0 indicating a non-DC mode.

The mode value (MV6) for the sixth touch time period (TP #6) which is a dummy period is set to a mode value 0 indicating a non-DC mode.

As periods related to the finger, the mode values (MV2 to 5) for the second to fifth touch time periods (TP #2 to 5) for sensing the finger and the pen position are set to a mode value (0) indicating a non-DC mode.

Regardless of the finger, as periods for sensing only the pen 20, the mode values (MV7, 8, 10-16) for the 7th and 8th, the 10th to 16th touch time periods (TP #7, 8, 10-16) for sensing pen data are set to a mode value (1) indicating a DC mode.

As described above, the second pen protocol may be implemented by setting the type values and mode values for the first to sixteenth touch time periods (TP #1 to TP #16).

The features according to the change and setting of the pen protocol according to embodiments of the present disclosure are described, by comparing the first pen protocol of FIG. 24 and the second pen protocol of FIG. 25.

The touch circuit 300 according to embodiments of the present disclosure supplies the uplink signal (ULS) to one or more touch electrodes (TE) of the plurality of touch electrodes (TE), during one or more touch time periods set as an uplink communication period (ULT) among the N touch time periods (TP #1 to TP #16) included in each of a plurality of touch frame (TF) times, and receives the downlink signal (DLS), which is a pen signal, through one or more touch electrodes (TE) of the plurality of touch electrodes (TE) during one or more touch time periods set as a downlink communication period (DLT) among the N touch time periods (TP #1~TP #16).

The touch circuit 300 according to embodiments of the present disclosure may perform a pen protocol change function. After the touch circuit 300 performs the pen protocol change function, when the touch circuit 300 operated according to the first pen protocol operates according to the second pen protocol, the role of each of a plurality of touch time periods (TP #1 to TP #16) in one touch frame (TF) time may be changed. Accordingly, each type (finger position sensing, pen position sensing, pen data sensing, noise sensing, etc.), each mode (DC mode, non-DC mode, etc.), or the like of a plurality of touch time periods (TP #1 to TP #16) within one touch frame (TF) time may be changed.

After the touch circuit 300 according to embodiments of the present disclosure performs a pen protocol change function, when the touch circuit 300 operated according to the first pen protocol operates according to the second pen protocol, the number or sequence of one or more touch time periods set as a downlink communication period (DLT) among the N touch time periods (TP #1~TP #16) included in the first touch frame (TF1) time among the plurality of touch frame (TF) times may be different from the number or sequence of one or more touch time periods set as a downlink communication period (DLT) among the N touch time periods (TP #1~TP #16) included in the second touch frame (TF2) time different from the first touch frame (TF1) time among the plurality of touch frame (TF) time.

During one or more touch time periods set as a downlink communication period (DLT) among the N touch time periods (TP #1~TP #16) included in the first touch frame (TF1) time, the touch circuit 300 receives a downlink signal (DLS) which is a pen signal output from the first pen 20-1, and during one or more touch time periods set as a downlink communication period (DLT) among the N touch time periods (TP #1 to TP #16) included in the second touch frame (TF2) time, the touch circuit 300 may receive a downlink signal (DLS) which is a pen signal output from the second pen 20-2 different from the first pen 20-1. For example, the first pen 20-1 and the second pen 20-2 are different in at least one of a manufacturer, a model, and an operating pen protocol.

The downlink communication period (DLT) may include a pen position sensing time period (P) for sensing the pen position of the pen 20, a pen tilt sensing time period (T) for sensing the pen tilt of the pen 20, a pen data transmission time period (D) for sensing pen information of the pen 20, and the like.

Among the N touch time periods (TP #1 to TP #16) included in each of a plurality of touch frame (TF) times, one or more first touch time periods (e.g., pen position sensing time period (P), etc.) and one or more second touch time periods (e.g., pen data transmission time period (D), etc.) may be set to a downlink communication period (DLT). Here, the first downlink signal (DLS) during one or more first touch time periods may be a pen signal including periodic pulses (e.g., a pen position signal (PPS), pen tilt signal (PTS), etc.), and the second downlink signal (DLS) during one or more second touch time periods may be a pen signal including non-periodic pulses (e.g., pen data (PDATA), etc.).

The uplink signal (ULS) may include pen driving control information. For example, an uplink signal (ULS) may include a beacon signal (BCON).

The beacon signal (BCON) may include one or more of touch panel type information (e.g., in-cell type, add-on type, etc.), touch time period information (LHB information), frequency information of downlink signal (DLS), information on the number of pulses of downlink signal (DLS), information on the number of touch time period following the uplink communication period (ULT), and driving timing information.

The beacon signal (BCON) may further include power mode information (e.g., information on touch time period where a panel and a pen are not driven to reduce power consumption). The beacon signal (BCON) may further include information for driving synchronization between the touch panel (TSP) and the pen 20.

The touch time period for transmitting the beacon signal (BCON), the format of various information included in the beacon signal (BCON), and the signal format of the beacon signal (BCON) may be previously defined with a pen protocol.

After the touch circuit 300 according to embodiments of the present disclosure performs a pen protocol change function, when the touch circuit 300 operated according to the first pen protocol operates according to the second pen protocol, the number or sequence of one or more touch time periods set as an uplink communication period (ULT) among the N touch time periods (TP #1~TP #16) included in the second touch frame (TF2) time different from the first touch frame (TF1) time may be different from the number or sequence of one or more touch time periods set as an uplink communication period (ULT) among the N touch time periods (TP #1~TP #16) included in the first touch frame (TF1) time.

The touch circuit 300 according to the embodiments of the present disclosure may set one or more first touch time periods and one or more second touch time periods among the N touch time periods (TP #1 to TP #16) included in each of a plurality of touch frame (TF) times to the DC mode period and the non-DC mode period, supply the DC voltage to all or part of the plurality of touch electrodes (TE) during one or more first touch time periods set to the DC mode period, and supply the non-DC voltage to all or part of the plurality of touch electrodes (TE) or stop the voltage supply during one or more second touch time periods set as the non-DC mode period.

After the touch circuit 300 according to embodiments of the present disclosure performs a pen protocol change function, when the touch circuit 300 operated according to the first pen protocol operates according to the second pen protocol, the number or sequence of one or more touch time periods set as a DC mode period among the N touch time periods (TP #1~TP #16) included in the second touch frame (TF2) time may be different from the number or sequence of one or more touch time periods set as a DC mode period among the N touch time periods (TP #1~TP #16) included in the first touch frame (TF1) time.

The touch circuit 300 according to the embodiments of the present disclosure may set one or more first touch time periods and one or more second touch time periods among the N touch time periods (TP #1~TP #16) included in each of a plurality of touch frame (TF) times as the DC mode period and the non-DC mode period, supply the DC voltage to all or part of the plurality of touch electrodes (TE) during one or more first touch time periods set as the DC mode period, and supply the non-DC voltage to all or part of the plurality of touch electrodes (TE) or stop the voltage supply during one or more second touch time periods set as the non-DC mode period.

All or part of one or more touch time periods set as a downlink communication period (DLT) among N touch time periods (TP #1 to TP #16) included in each of a plurality of touch frame (TF) times may be set as a DC mode period.

The number or sequence of one or more touch time periods set as a DC mode period among the N touch time periods (TP #1~TP #16) included in the first touch frame (TF1) time may be different from the number or sequence of one or more touch time periods set as the DC mode period among the N touch time periods (TP #1~TP #16) included in the second touch frame (TF2) time.

The pen protocol setting circuit 1400 may set the number or sequence of one or more touch time periods set as a downlink communication period (DLT) among the N touch time periods (TP #1~TP #16) included in the first touch frame (TF1) time of a plurality of touch frame (TF) times to be different from the number or sequence of one or more touch time periods set as a downlink communication period (DLT) among the N touch time periods (TP #1~TP #16) included in the second touch frame (TF2) time different from the first touch frame (TF1) time of a plurality of touch frame (TF) times.

During the one or more touch time periods set as the downlink communication period (DLT) among the N touch time periods (TP #1 to TP #16) included in the first touch frame (TF1) time, the sensing circuit 1410 may receive a downlink signal (DLS) which is a pen signal output from the first pen 20-1.

During the one or more touch time periods set as the downlink communication period (DLT) among the N touch time periods (TP #1 to TP #16) included in the second touch frame (TF2) time, the sensing circuit 1410 may receive a downlink signal (DLS) which is a pen signal output from the second pen 20-2 different from the first pen 20-1.

The first pen 20-1 and the second pen 20-2 are different in at least one of a manufacturer, a model, and an operating pen protocol.

The pen protocol setting circuit 1400 may set one or more first touch time periods and one or more second touch time periods, among the N touch time periods (TP #1 to TP #16) included in each of the plurality of touch frame (TF) times, as a downlink communication period (DLT). Here, the first downlink signal (DLS) during one or more first touch time periods may include periodic pulses, and the second downlink signal (DLS) during one or more second touch time periods may include non-periodic pulses.

The pen protocol setting circuit 1400 may set the number or sequence of one or more touch time periods set as an uplink communication period (ULT) among the N touch time periods (TP #1~TP #16) included in the first touch frame (TF1) time of a plurality of touch frame (TF) times to be different from the number or sequence of one or more touch time periods set as an uplink communication period (ULT) among the N touch time periods (TP #1~TP #16) included in the second touch frame (TF2) time different from the first touch frame (TF1) time of a plurality of touch frame (TF) times.

The pen protocol setting circuit 1400 may set one or more first touch time periods and one or more second touch time periods, among the N touch time periods (TP #1 to TP #16) included in each of the plurality of touch frame (TF) times, as a DC mode period and a non-DC mode period, respectively.

The sensing circuit 1410 may supply a DC voltage to all or part of the plurality of touch electrodes (TE), during one or more first touch time periods set as the DC mode period, and may supply the non-DC voltage to all or part of the plurality of touch electrodes (TE) or may stop the voltage supply during one or more second touch time periods set as the non-DC mode period.

The pen protocol setting circuit 1400 may set all or part of one or more touch time periods set as a downlink communication period (DLT), among the N touch time periods (TP #1 to TP #16) included in each of a plurality of touch frame (TF) times, as a DC mode period.

The pen protocol setting circuit 1400 may set the number or sequence of one or more touch time periods set as a DC mode period among the N touch time periods (TP #1~TP #16) included in the first touch frame (TF1) time to be different from the number or sequence of one or more touch time periods set as a DC mode period among the N touch time periods (TP #1~TP #16) included in the second touch frame (TF2) time.

The touch circuit 300 according to embodiments of the present disclosure may include a sensing circuit 1410 that supplies DC voltage to one or more of the plurality of touch electrodes TE, during one or more first touch time periods set as a DC mode period among the N touch time periods (TP #1 to TP #16) included in each of a plurality of touch frame (TF) times, and supplies a non-DC voltage to one or more of the plurality of touch electrodes TE or stops the voltage supply during one or more second touch time periods set as a non-DC mode period among the N touch time periods (TP #1~TP #16), and a pen protocol setting circuit 1400 that sets one or more first touch time periods and one or more second touch time periods, among the N touch time periods (TP #1 to TP #16) included in each of a plurality of touch frame (TF) times, as a DC mode period and a non-DC mode period, and sets the number or sequence of one or more first touch time periods set as the DC mode period, among the N touch time periods (TP #1 to TP #16) included in the first touch frame (TF1) time of the plurality of touch frame (TF) times to be different from the number or sequence of one or more touch time periods set as the DC mode period among the N touch time periods (TP #1~TP #16) included in the second touch frame (TF2) time different from the first touch frame (TF1) time of the plurality of touch frame (TF) times.

Embodiments of the present disclosure may provide a pen sensing method comprising a first step of outputting a first beacon signal based on the first pen protocol, a second step of determining whether the first pen signal output from the first pen operating with a first pen protocol is received in response to the first beacon signal, a third step of sensing the first pen when the first pen signal is received in the second step, a fourth step of outputting a second beacon signal based on a second pen protocol different from the first pen protocol at a next touch frame time when the first pen signal is not received in the second step, a fifth step of determining whether the second pen signal output from the second pen operating with a second pen protocol is received in response to the second beacon signal, and a sixth step of sensing the second pen when the second pen signal is received in the fifth step.

When the first pen signal is not received in the second step, a pen protocol change setting may be performed to change the operating pen protocol from the first pen protocol to the second pen protocol.

Figure 26:
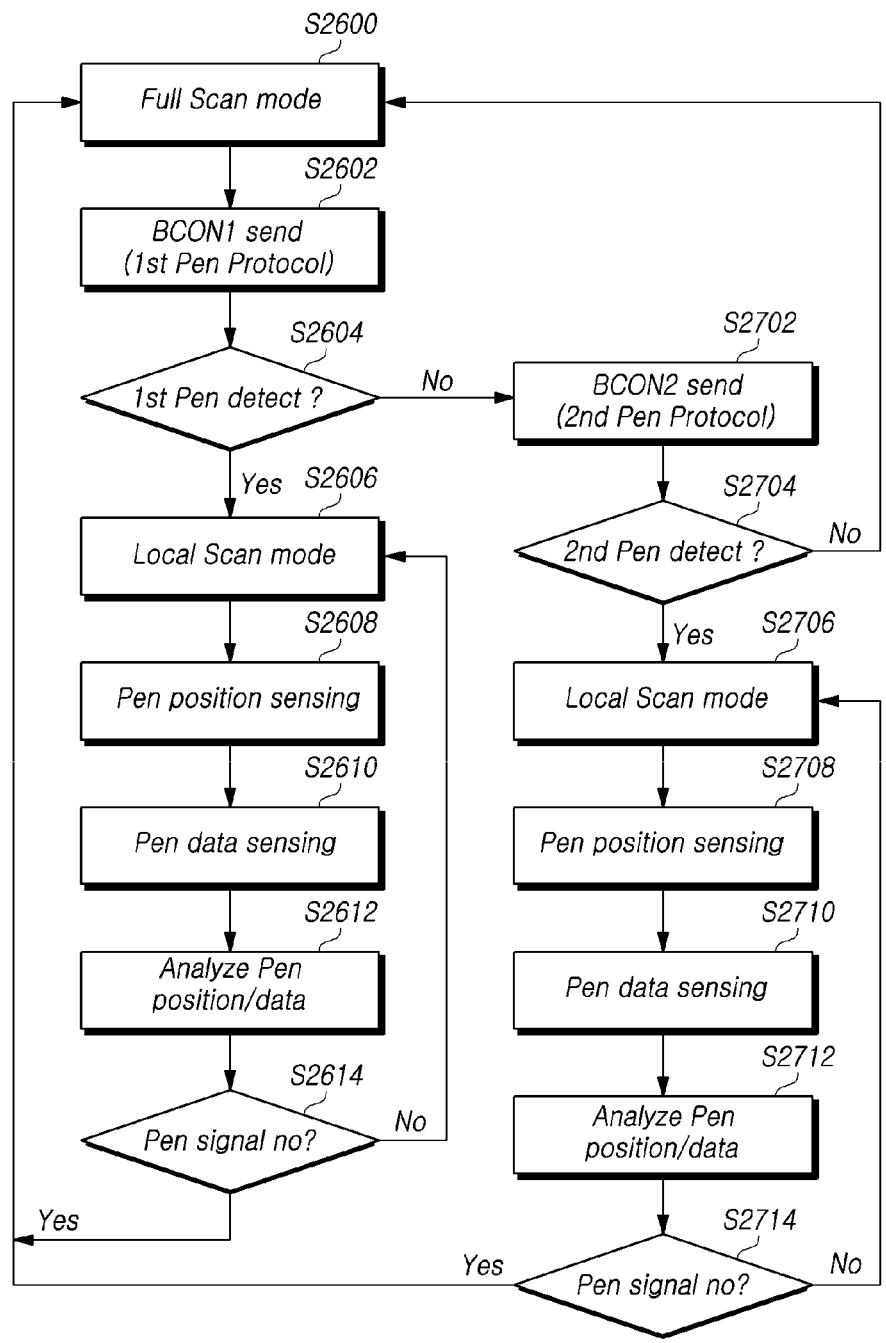
FIG. 26 is a flowchart of an operation method of a touch display device according to embodiments of the present disclosure.

FIG. 26 is a flowchart of an operation method of a touch display device 10 according to embodiments of the present disclosure.

First, the touch circuit 300 operates in a full scan mode (S2600).

The touch circuit 300 basically performs an operation for sensing a finger in a full scan mode, and supplies a beacon signal (BCON) to the touch panel (TSP) to detect the pen 20.

At this time, first, the touch circuit 300 outputs a first beacon signal (BCON1) conforming to the first pen protocol as an uplink signal (ULS) (S2602). Thereafter, the touch circuit 300 determines whether the first pen 20-1 responding to the first beacon signal (BCON1) is detected (S2604).

When the first pen 20-1 operating with the first pen protocol is positioned in contact with or close to the touch panel (TSP), the first pen 20-1 outputs a pen signal in response to the first beacon signal (BCON1). Accordingly, the touch circuit 300 detects the first pen 20-1 operating with the first pen protocol.

When there is no first pen 20-1 operating with the first pen protocol or when the pen 20 operating with a different pen protocol from the first pen protocol is positioned in contact with or close to the touch panel (TSP), the touch circuit 300 does not detect the first pen 20-1 operating with the first pen protocol.

In step S2604, when the first pen 20-1 responding to the first beacon signal (BCON1) is detected, the touch circuit 300 enters a local scan mode (S2606).

The touch circuit 300 operates in a local scan mode according to the first pen protocol, senses the pen position for the first pen 20-1 operating with the first pen protocol (S2608), senses pen data (S2610), and analyze the pen position and the pen data (S2612).

The touch circuit 300 determines whether the pen signal of the first pen 20-1 is no longer sensed (S2614).

In step S2614, if it is determined that the pen signal of the first pen 20-1 is no longer sensed, the process returns to step S2600, and the touch circuit 300 is switched to the full scan mode to operate. Alternatively, in order to sense the second pen 20-2 different from the first pen 20-1, in step S2614, if it is determined that the pen signal of the first pen 20-1 is no longer sensed, the touch circuit 300 may supply the second beacon signal (BCON2) corresponding to the second pen protocol to the touch panel (TSP) as an uplink signal (ULS) (S2702).

In step S2614, if it is determined that the pen signal of the first pen 20-1 is continuously sensed, the process returns to step S2606, and the touch circuit 300 continues to operate in a local scan mode according to the first pen protocol.

In step S2604, if the first pen 20-1 responding to the first beacon signal (BCON1) is not detected (or regardless of detection of the first pen 20-1 responding to the first beacon signal (BCON1)), in the next touch frame, the second beacon signal (BCON2) corresponding to the second pen protocol is supplied to the touch panel (TSP) as an uplink signal ULS (S2702). Thereafter, the touch circuit 300 determines whether the second pen 20-2 responding to the second beacon signal (BCON2) is detected (S2704).

When the second pen 20-2 operating with the second pen protocol is positioned in contact with or close to the touch panel (TSP), the second pen 20-2 outputs a pen signal in response to the second beacon signal (BCON2). Accordingly, the touch circuit 300 detects the second pen 20-2 operating with the second pen protocol.

When there is no second pen 20-2 operating with the second pen protocol, or when the pen 20 operating with a different pen protocol from the second pen protocol is positioned in contact with or close to the touch panel (TSP), the touch circuit 300 does not detect the second pen 20-2 operating with the second pen protocol.

In step S2704, when the second pen 20-2 responding to the second beacon signal (BCON2) is detected, the touch circuit 300 enters a local scan mode (S2706).

The touch circuit 300 operates in a local scan mode according to the second pen protocol, senses the pen position for the second pen 20-2 operating with the second pen protocol (S2708), senses pen data (S2710), and analyzes the pen position and pen data (S2712).

The touch circuit 300 determines whether the pen signal of the second pen 20-2 is no longer sensed (S2714).

In step S2714, when it is determined that the pen signal of the second pen 20-2 is no longer sensed, the process returns to step S2600 again, and the touch circuit 300 is switched to a full scan mode to operate. Alternatively, in order to sense the first pen 20-1 different from the second pen 20-2, in step S2714, if it is determined that the pen signal of the second pen 20-2 is no longer sensed, the process returns to step S2602 again, and the touch circuit 300 may supply the first beacon signal (BCON1) corresponding to the first pen protocol to the touch panel (TSP) as an uplink signal ULS (S2602).

In step S2714, if it is determined that the pen signal of the second pen 20-2 is continuously sensed, the process returns to step S2706, and the touch circuit 300 continues to operate in the local scan mode according to the second pen protocol.

If the touch display device 10 provides the pen protocol setting change to only two pen protocols (first and second pen protocols), in step S2704, when the second pen 20-2 responding to the second beacon signal BCON2 is not detected, the process returns to step S2600 again, and the touch circuit 300 is switched to a full scan mode to operate.

When the touch display device 10 is capable of changing settings for more pen protocols in addition to the first and second pen protocols, in step S2704, if the second pen 20-2 that responds to the second beacon signal (BCON2) is not detected, the touch display device 10 may supply a third beacon signal corresponding to a third pen protocol to the touch panel (TSP) in the next touch frame, and proceed as described above.

According to the above, it is possible to sense a plurality of pens 20 operating with completely different pen protocols by using one touch panel (TSP) and using one touch circuit 300.

Meanwhile, the touch circuit 300 of the touch display device 10 according to the embodiments of the present disclosure may simultaneously sense the first pen 20-1 and the second pen 20-2 that operate with the first pen protocol and the second pen protocol that are different from each other.

To this end, the touch circuit 300 may supply the first and second beacon signals (BCON1, BCON2) respectively corresponding to the heterogeneous first and second pen protocols to the touch panel TSP during a specific touch time period in different touch frames, and then, may set subsequent touch frames to be suitable for one or more of the first and second pen protocols, depending on whether the pen responds to the heterogeneous first and second beacon signals (BCON1, BCON2).

When both of the first pen 20-1 that outputs a downlink signal (DLS) in response to the first beacon signal (BCON1) and the second pen 20-2 that outputs a downlink signal (DLS) in response to the second beacon signal (BCON2) are detected, some touch frames among the subsequent touch frames are set as a first pen protocol for sensing the first pen 20-1, and other touch frames may be set as a second pen protocol for sensing the second pen 20-2.

For example, when the touch display device 10 according to embodiments of the present disclosure supports two pen protocols, the touch circuit 300 of the touch display device 10 may supply the first beacon signal (BCON1) corresponding to the first pen protocol to the touch panel (TSP) during a specific touch time period within an i-th touch frame, and may supply the second beacon signal (BCON2) corresponding to the second pen protocol to the touch panel (TSP) during a specific touch time period within an (i+1)-th touch frame.

Thereafter, when the first pen 20-1 that outputs the downlink signal (DLS) in response to the first beacon signal (BCON1) outputted during a specific touch time period within the i-th touch frame is detected, the touch circuit 300 may set the N touch time period included in an (i+2)-th touch frame to be suitable for the first pen protocol, and operate in conjunction with the first pen 20-1 to sense the first pen 20-1.

Then, when the second pen 20-2 that outputs the downlink signal DLS in response to the second beacon signal (BCON2) outputted during a specific touch time period within the (i+1)-th touch frame is detected, the touch circuit 300 may set the N touch time periods included in the (i+3)-th touch frame to be suitable for the second pen protocol, and operate in conjunction with the second pen 20-2 to sense the second pen 20-2.

Meanwhile, after supplying the first and second beacon signals (BCON1, BCON2) respectively corresponding to the heterogeneous first and second pen protocols to the touch panel (TSP) in different touch frames, when the first pen 20-1, which outputs the downlink signal (DLS) in response to the first beacon signal (BCON1), is detected, and when the second pen 20-2, which outputs the downlink signal (DLS) in response to the second beacon signal (BCON2), is not detected, the touch circuit 300 may set subsequent touch frames as a first pen protocol for sensing the first pen 20-1.

Alternatively, after supplying the first and second beacon signals (BCON1, BCON2) respectively corresponding to the heterogeneous first and second pen protocols to the touch panel (TSP) in different touch frames, when the first pen 20-1, which outputs the downlink signal (DLS) in response to the first beacon signal (BCON1), is not detected, and when the second pen 20-2, which outputs the downlink signal (DLS) in response to the second beacon signal (BCON2), is detected, the touch circuit 300 may set subsequent touch frames as a second pen protocol for sensing the second pen 20-2.

Using the above-described method, the touch display device 10 according to embodiments of the present disclosure can simultaneously sense three or more pens operating with three or more pen protocols.

According to the embodiments of the present disclosure described above, the touch display device 10, the touch circuit 300, and the pen sensing method for sensing various pens may be provided.

In addition, according to embodiments of the present disclosure, it is possible to provide the touch display device 10, the touch circuit 300, and the pen sensing method for setting various pen protocols.

In addition, according to embodiments of the present disclosure, it is possible to provide the touch display device 10, the touch circuit 300, and the pen sensing method that can change existing protocol into a pen protocol capable of interworking with the changed pen 20, when the interworking pen 20 is changed.

In addition, according to embodiments of the present disclosure, when it is necessary to interwork with two or more pens (20-1, 20-2) operating with different pen protocols, it is possible to provide the touch display device 10, the touch circuit 300, and the pen sensing method capable of sensing two or more pens (20-1, 20-2) while changing the pen protocol every one or two or more touch frame times.

The above description has been presented to enable any person skilled in the art to make and use the technical idea of the present disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the present disclosure. The above description and the accompanying drawings provide an example of the technical idea of the present disclosure for illustrative purposes only. That is, the disclosed embodiments are intended to illustrate the scope of the technical idea of the present disclosure. Thus, the scope of the present disclosure is not limited to the embodiments shown, but is to be accorded the widest scope consistent with the claims. The scope of protection of the present disclosure should be construed based on the following claims, and all technical ideas within the scope of equivalents thereof should be construed as being included within the scope of the present disclosure.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A touch display device, comprising:
a touch panel including a plurality of touch electrodes; and
a touch circuit configured to supply an uplink signal to one or more touch electrodes among the plurality of touch electrodes during one or more touch time periods set as an uplink communication period among N touch time periods included in each of a plurality of touch frame times, and to receive a downlink signal, which is a pen signal, during one or more touch time periods set as a downlink communication period among the N touch time periods through one or more touch electrodes among the plurality of touch electrodes,
wherein a number or sequence of one or more touch time periods set as the downlink communication period among the N touch time periods included in a first touch frame time among the plurality of touch frame times is different from a number or sequence of one or more touch time periods set as the downlink communication period among the N touch time periods included in a second touch frame time that is different from the first touch frame time among the plurality of touch frame times,
wherein the touch circuit is configured to set one or more first touch time periods and one or more second touch time periods among the N touch time periods to include in at least one or more of the plurality of touch frame times a DC mode period and a non-DC mode period respectively,
supply a DC voltage to all or part of the plurality of touch electrodes during the one or more first touch time periods set as the DC mode period, and
supply a non-DC voltage to all or part of the plurality of touch electrodes or stop the voltage supply during the one or more second touch time periods set as the non-DC mode period.

2. The touch display device of claim 1, wherein the touch circuit is configured to receive the downlink signal which is a first pen signal output from a first pen, during one or more touch time periods set as the downlink communication period among the N touch time periods included in the first touch frame time, and receive the downlink signal which is a second pen signal output from a second pen different from the first pen, during one or more touch time periods set as the downlink communication period among the N touch time periods included in the second touch frame time, and
wherein the first pen and the second pen are different in at least one of a manufacturer, a model, or an operating pen protocol.

3. The touch display device of claim 1, wherein the one or more first touch time periods and the one or more second touch time periods among the N touch time periods included in each of the plurality of touch frame times are set as the downlink communication period, a first downlink signal during the one or more first touch time periods includes periodic pulses, and a second downlink signal during the one or more second touch time periods includes non-periodic pulses.

4. The touch display device of claim 1, wherein the uplink signal includes pen driving control information, and
a number or sequence of one or more touch time periods set as the uplink communication period among the N touch time periods included in a first touch frame time among the plurality of touch frame times is different from a number or sequence of one or more touch time periods set as the uplink communication period among the N touch time periods included in a second touch frame time that is different from the first touch frame time among the plurality of touch frame times.

5. The touch display device of claim 1, wherein all or part of one or more touch time periods set as the downlink communication period, among the N touch time periods included in each of the plurality of touch frame times, are set as the DC mode period.

6. The touch display device of claim 1, wherein a number or sequence of one or more touch time periods set as the DC mode period among the N touch time periods included in the first touch frame time, and a number or sequence of one or more touch time periods set as the DC mode period among the N touch time periods included in the second touch frame time are different from each other.

7. The touch display device of claim 1, further comprising a type register configured to store a type value indicating a type of driving operation of the touch circuit associated with a pen, with respect to each of the N touch time periods included in the plurality of touch frame times,
wherein the touch circuit is configured to modify the type register between the first touch frame time and the second touch frame time.

8. The touch display device of claim 1, further comprising a mode register configured to store a mode value indicating a mode for driving the touch panel, with respect to each of the N touch time periods, wherein the touch circuit configured to modify the mode register between the first touch frame time and the second touch frame time.

9. The touch display device of claim 1, wherein the touch circuit is configured to set the one or more first touch time periods and the one or more second touch time periods among the N touch time periods included in each of the plurality of touch frame times, as a first noise index period and a second noise index period, respectively,
supply a driving signal having an integer multiple of a first frequency to one or more of the plurality of touch electrodes, during the one or more first touch time periods set as the first noise index period, and
supply a driving signal having an integer multiple of a second frequency different from the first frequency to one or more of the plurality of touch electrodes, during the one or more second touch time periods set as the second noise index period.

10. A touch circuit, comprising:
a sensing circuit configured to supply an uplink signal to one or more touch electrodes among a plurality of touch electrodes during one or more touch time periods set as an uplink communication period among N touch time periods included in each of a plurality of touch frame times, and to receive a downlink signal, which is a pen signal, during one or more touch time periods set as a downlink communication period among the N touch time periods through one or more touch electrodes among the plurality of touch electrodes; and
a pen protocol setting circuit configured to set a number or sequence of one or more touch time periods set as the downlink communication period among the N touch time periods included in a first touch frame time among the plurality of touch frame times, and a number or sequence of one or more touch time periods set as the downlink communication period among the N touch time periods included in a second touch frame time that is different from the first touch frame time, the number or sequence of one or more touch time periods set as the downlink communication period in the first touch frame time is different from the number or sequence of one or more touch time periods set as the downlink communication period in the second touch frame time,
wherein the pen protocol setting circuit is configured to set one or more first touch time periods and one or more second touch time periods among the N touch time periods to include in one or more of the plurality of touch frame times a DC mode period and a non-DC mode period,
wherein the sensing circuit is configured to supply a DC voltage to all or part of the plurality of touch electrodes during the one or more first touch time periods set as the DC mode period, and supply a non-DC voltage to all or part of the plurality of touch electrodes or stop the voltage supply during the one or more second touch time periods set as the non-DC mode period.

11. The touch circuit of claim 10, wherein the sensing circuit is configured to receive the downlink signal which is a first pen signal output from a first pen, during one or more touch time periods set as the downlink communication period among the N touch time periods included in the first touch frame time, and receive the downlink signal which is a second pen signal output from a second pen different from the first pen, during one or more touch time periods set as the downlink communication period among the N touch time periods included in the second touch frame time, and wherein the first pen and the second pen are different in at least one of a manufacturer, a model, or an operating pen protocol.

12. The touch circuit of claim 10, wherein the pen protocol setting circuit is configured to set a number or sequence of one or more touch time periods set as the uplink communication period among the N touch time periods included in the first touch frame time among the plurality of touch frame times, and a number or sequence of one or more touch time periods set as the uplink communication period among the N touch time periods included in the second touch frame time different from the first touch frame time, the number or sequence of one or more touch time periods set as the uplink communication period in the first touch frame time is different from the number or sequence of one or more touch time periods set as the uplink communication period in the second touch frame time.

13. The touch circuit of claim 10, wherein the pen protocol setting circuit configured to set all or part of one or more touch time periods set as the downlink communication period, among the N touch time periods included in each of the plurality of touch frame times, as the DC mode period.

14. The touch circuit of claim 10, wherein the pen protocol setting circuit is configured to set a number or sequence of one or more touch time periods set as the DC mode period among the N touch time periods included in the first touch frame time, and a number or sequence of one or more touch time periods set as the DC mode period among the N touch time periods included in the second touch frame time to be different from each other.

15. A method of sensing a pen for a touch display device, the method comprising:
outputting a first beacon signal based on a first pen protocol;
determining whether a first pen signal output from a first pen operating with the first pen protocol is received in response to the first beacon signal;
sensing the first pen in response to receiving the first pen signal from the first pen;
outputting a second beacon signal based on a second pen protocol that is different from the first pen protocol;
determining whether a second pen signal output from a second pen operating with the second pen protocol is received in response to the second beacon signal; and
sensing the second pen in response to receiving the second pen signal from the second pen,
wherein when the first pen signal is not received after the outputting the first beacon signal, the touch display device performs a pen protocol change setting for changing an operation pen protocol from the first pen protocol to the second pen protocol, and performs the outputting the second beacon signal.

16. The method of claim 15, wherein the sensing the first pen includes sensing a pen position and pen data for the first pen, and analyzing the pen position and the pen data for the first pen, and wherein the sensing the second pen includes sensing a pen position and pen data for the second pen, and analyzing the pen position and the pen data for the second pen.

17. The method of claim 15, wherein the touch display device is configured to operate in a full scan mode before the outputting the first beacon signal, and operate in a local scan mode when the first pen signal is received after the outputting the first beacon signal or the second pen signal is received after the outputting the second beacon signal.

* * * * *